US011989105B2

(12) United States Patent
Yoshida et al.

(10) Patent No.: US 11,989,105 B2
(45) Date of Patent: May 21, 2024

(54) STORAGE SYSTEM AND CONTROL METHOD FOR ADJUSTING TIMEOUT BASED ON NETWORK CONDITIONS

(71) Applicant: Hitachi, Ltd., Tokyo (JP)

(72) Inventors: Misato Yoshida, Tokyo (JP); Takaki Nakamura, Tokyo (JP); Takahiro Yamamoto, Tokyo (JP); Masakuni Agetsuma, Tokyo (JP)

(73) Assignee: HITACHI, LTD., Tokyo (JP)

( * ) Notice: Subject to any disclaimer, the term of this patent is extended or adjusted under 35 U.S.C. 154(b) by 79 days.

(21) Appl. No.: 17/690,302

(22) Filed: Mar. 9, 2022

(65) Prior Publication Data

US 2023/0090032 A1  Mar. 23, 2023

(30) Foreign Application Priority Data

Sep. 22, 2021  (JP) .................................. 2021-154178

(51) Int. Cl.
*G06F 11/20* (2006.01)
*G06F 11/07* (2006.01)

(52) U.S. Cl.
CPC ...... *G06F 11/2028* (2013.01); *G06F 11/0709* (2013.01); *G06F 11/0757* (2013.01)

(58) Field of Classification Search
CPC ............ G06F 11/0757; G06F 11/2023; G06F 11/2025; G06F 11/2028; G06F 11/203; H04L 41/0663; H04L 41/0823; H04L 41/083; H04L 41/0836; H04L 43/10; H04L 43/103; H04L 69/40
See application file for complete search history.

(56) References Cited

U.S. PATENT DOCUMENTS

| | | | | |
|---|---|---|---|---|
| 6,526,433 B1* | 2/2003 | Chang | ............... | G06F 11/0709 709/224 |
| 6,782,496 B2* | 8/2004 | Fleming | ............. | G06F 11/0715 714/48 |
| 9,292,371 B1* | 3/2016 | Clifford | ............. | G06F 11/0709 |
| 10,083,100 B1 | 9/2018 | Agetsuma et al. | | |

(Continued)

FOREIGN PATENT DOCUMENTS

JP  2019-101703 A  6/2019

OTHER PUBLICATIONS

ZooKeepter Programmer's Guide, Last Published: Mar. 27, 2021.

*Primary Examiner* — Gabriel Chu
(74) *Attorney, Agent, or Firm* — MATTINGLY & MALUR, PC

(57) ABSTRACT

In a storage system, a failover time is shortened while avoiding erroneous detection of a node failure according to network quality. The storage system includes a plurality of storage nodes having processors; a data storage device; the plurality of storage nodes having the processors for processing data to be input to and output from the storage device; and a network for connecting the plurality of storage nodes, wherein the plurality of storage nodes monitors the operation status of each other to perform node failure detection for determining the occurrence of a failure of the storage node on the basis of a time-out value, performs a failover process in which one of the other storage nodes takes over the process of the storage node when the failure occurs in the storage node, and adjusts the time-out value on the basis of the status of the network between the storage nodes.

10 Claims, 16 Drawing Sheets

(56) References Cited

U.S. PATENT DOCUMENTS

| | | | |
|---|---|---|---|
| 2005/0102393 A1* | 5/2005 | Murray | H04L 67/1036 709/224 |
| 2005/0198190 A1* | 9/2005 | Zavalkovsky | H04L 65/00 709/217 |
| 2012/0124431 A1* | 5/2012 | Bauer | H04L 67/1029 714/E11.067 |
| 2012/0185585 A1* | 7/2012 | Bhate | H04L 63/1458 709/224 |
| 2013/0124752 A1* | 5/2013 | Griffith | G06F 11/3093 709/235 |
| 2016/0117213 A1* | 4/2016 | Arjun | G06F 11/0757 714/55 |
| 2019/0007278 A1* | 1/2019 | Singh | H04L 67/10 |
| 2019/0163593 A1 | 5/2019 | Agetsuma et al. | |
| 2019/0245735 A1* | 8/2019 | Umezawa | H04L 43/10 |
| 2020/0226042 A1 | 7/2020 | Agetsuma et al. | |
| 2021/0182132 A1* | 6/2021 | Chen | G06F 11/0793 |
| 2022/0027246 A1 | 1/2022 | Agetsuma et al. | |

\* cited by examiner

FIG. 6

[SYSTEM STATISTICAL INFORMATION]            143

ID                                  1431

| IO PERFORMANCE | PACKET AMOUNT | ... |
|---|---|---|
| 2 | 3 | ... |

VALUE                                1432

|  | IO PERFORMANCE (ms) | PACKET AMOUNT (KB/s) | ... |
|---|---|---|---|
| BASE VALUE | (FIXED) 5 | (FIXED) 1000 | ... |
| CURRENT VALUE | 10 | 1000 | ... |

LOAD INFLUENCE OF CURRENT VALUE      1433

|  | IO PERFORMANCE | PACKET AMOUNT | ... |
|---|---|---|---|
| FUNDAMENTAL COEFFICIENT | 1.5 | 1 | ... |
| FUNDAMENTAL ADDITION VALUE | 1 | 0 | ... |

FIG. 8

[DURING-INSTALL TIME-OUT VALUE]                                147

|  | PROCESS A DURING INSTALL (s) | PROCESS B DURING INSTALL (s) |
| --- | --- | --- |
| DEFAULT VALUE | (FIXED) 5 | (FIXED) 60 |
| OPERATION ENVIRONMENT ADAPTIVE VALUE | 10 | 120 |

FIG. 9

[DURING-OPERATION TIME-OUT VALUE]                              148

|  | NODE FAILURE DETECTION (s) | FO PROCESSING (s) | PROCESS C DURING OPERATION (s) |
| --- | --- | --- | --- |
| DEFAULT VALUE | (FIXED) 4 | (FIXED) 15 | (FIXED) 10 |
| OPERATION ENVIRONMENT ADAPTIVE VALUE | 8 | 30 | 20 |

FIG. 10

[IO HOST TIME-OUT INFORMATION]                                 149

| IO HOST TIME-OUT REQUIREMENT (s) | 30 |
| --- | --- |

STORAGE SYSTEM AND CONTROL METHOD FOR ADJUSTING TIMEOUT BASED ON NETWORK CONDITIONS

REFERENCE TO RELATED APPLICATION

The present application claims priority from Japanese application JP2021-154178, filed on Sep. 22, 2021, the contents of which is hereby incorporated by reference into this application.

The present invention relates to a storage system and a control method, and is suitably applied to, for example, a storage system including a plurality of storage nodes in each of which one or more SDSs (Software Defined Storages) are mounted. It should be noted that in the following description, the SDS refers to a storage device constructed by clustering a plurality of general-purpose servers on which software having a storage function is mounted.

In recent years, the market of an SDS (Software Defined Storage) in which a storage is made into software and operated in an arbitrary infrastructure environment has been growing. The SDS has a configuration obtained by clustering a plurality of general-purpose servers, and failover is performed to switch to a standby system when a failure occurs.

For example, Japanese Unexamined Patent Application Publication No. 2019-101703 discloses a method of failover when an SDS failure occurs. In an information processing system disclosed in Japanese Unexamined Patent Application Publication No. 2019-101703, control software configuring a redundancy group is distributed and arranged in each storage node included in the information processing system, and when any of the control software cannot be operated due to the occurrence of a failure of the storage node, the operation is continued by performing failover and reproducing alternative control software and configuration information used by the control software on an appropriate storage node.

In addition, for example, "ZooKeeper Programmer's Guide, [online], [Search on May 31, 2021], Internet (URL: http://oss.infoscience.co.jp/hadoop/zookeeper/docs/current/zookeeperProg rammers.html)" discloses a document for developers of Apache ZooKeeper (registered trademark) software. "ZooKeeper Programmer's Guide, [online], [Search on May 31, 2021], Internet (URL: http://oss.info-science.co.jp/hadoop/zookeeper/docs/current/zookeeper-Prog rammers.html)" discloses a method in which a time-out time of a fixed value is set in Apache ZooKeeper and when a communication interruption time exceeds the time-out time, it is regarded as a failure.

SUMMARY

By the way, since IO (Input/Output) from a host (host device) to a storage node is stopped during the failover, it is required to complete the failover in a short time when a failure of the storage node occurs. On the other hand, since high reliability is required for the storage system, it is also important to avoid erroneous detection of a node failure. In addition, the failover time required from the occurrence of the node failure to the completion of the failover corresponds to the total value of a node failure detection time set for detecting the presence or absence of a node failure and a failover processing time required for execution of a failover process.

However, in the prior art described above, since the time-out time (time-out value) of node failure detection is set by a fixed value, the following problems are assumed in the failover. First, if the time-out time of the node failure detection is too long, the failover time is prolonged and the IO stop time from the host is increased. On the other hand, if the time-out time of the node failure detection is too short, there is a possibility that a node failure is erroneously detected when the network load is heavy, and the reliability of the system deteriorates.

That is, the optimal time-out time of the node failure detection in the storage system changes depending on various system environments such as the network load, the operation environment of the system such as a public cloud or on-premises, the hardware configuration, and the switch configuration, and it has been difficult to determine such an optimal time-out time (time-out value) in the prior art.

The present invention has been made in consideration of the above points, and proposes a storage system and a control method capable of shortening a failover time while avoiding erroneous detection of a node failure according to network quality.

In order to solve the problems, the present invention provides a storage system including: a plurality of storage nodes having processors; a storage device for storing data; the plurality of storage nodes having the processors for processing data to be input to and output from the storage device; and a network for connecting the plurality of storage nodes, wherein the plurality of storage nodes monitors the operation status of each other to perform node failure detection for determining the occurrence of a failure of the storage node on the basis of a time-out value, performs a failover process in which one of the other storage nodes takes over the process of the storage node when the failure occurs in the storage node, and adjusts the time-out value on the basis of the status of the network between the storage nodes.

In addition, in order to solve the problems, the present invention provides a control method by a storage system, wherein the storage system includes: a plurality of storage nodes having processors; a storage device for storing data; the plurality of storage nodes having the processors for processing data to be input to and output from the storage device; and a network for connecting the plurality of storage nodes, wherein the plurality of storage nodes monitors the operation status of each other to perform node failure detection for determining the occurrence of a failure of the storage node on the basis of a time-out value, performs a failover process in which one of the other storage nodes takes over the process of the storage node when the failure occurs in the storage node, and adjusts the time-out value on the basis of the status of the network between the storage nodes.

According to the present invention, it is possible to shorten a failover time while avoiding erroneous detection of a node failure according to network quality.

BRIEF DESCRIPTION OF THE DRAWINGS

FIG. 6 is a diagram for showing an example of system statistical information 143;

FIG. 8 is a diagram for showing an example of a during-install time-out value 147;

FIG. 9 is a diagram for showing an example of a during-operation time-out value 148;

FIG. 10 is a diagram for showing an example of IC host time-out information 149;

DETAILED DESCRIPTION

Figure 1:
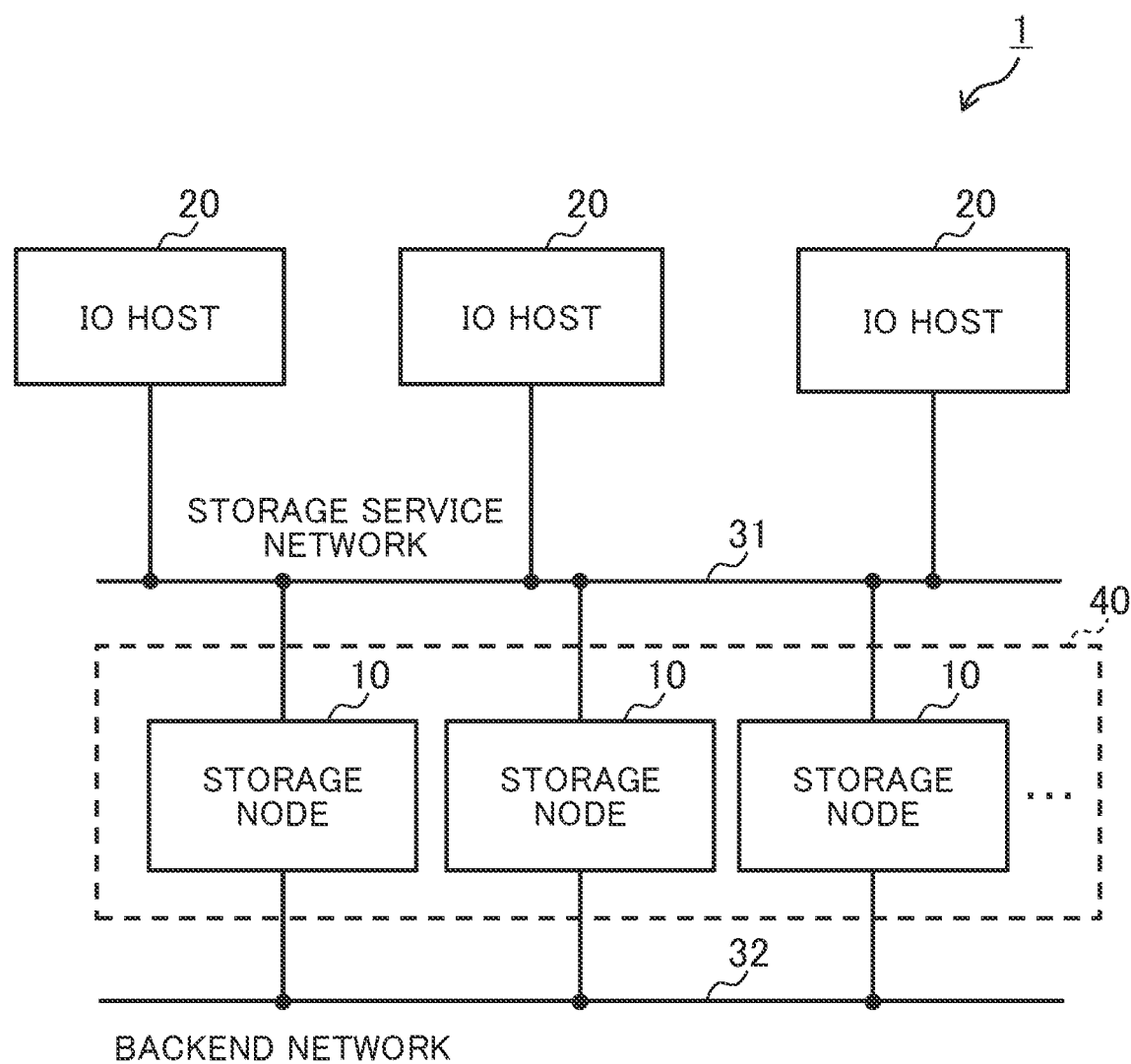
FIG. 1 is a block diagram for showing a configuration example of a storage system 1 according to an embodiment of the present invention.

Hereinafter, one embodiment of the present invention will be described in detail with reference to the drawings. The following description and drawings are examples for explaining the present invention, and are omitted and simplified as appropriate in order to clarify the description. In addition, all of the combinations of features described in the embodiment are not necessarily essential to the means for solving the invention. The present invention is not limited to embodiment, and all applications consistent with the ideas of the present invention are within the technical scope of the present invention. A person skilled in the art can make various additions, changes, and the like in the present invention within the scope of the present invention. The present invention can be also carried out in various other forms. Unless otherwise specified, each constitutional element may be a plurality of elements or a single element.

In the following description, various types of information will be described by expressions such as "table", "list", and "queue" in some cases, but may be expressed by data structures other than these. "XX table", "XX list", and the like will be referred to as "XX information" to indicate that they do not depend on a data structure. When describing the content of each information, expressions such as "identification information", "identifier", "name", "ID", and "number" are used, but these can be replaced with each other.

In addition, a process performed by executing a program may be described in the following description, but since the program is executed by at least one or more processors (for example, CPUs) to perform a predetermined process while using a storage resource (for example, a memory) and/or an interface device (for example, a communication port) as appropriate, the main unit of the process may be the processor. As similar to the above, the main unit of the process performed by executing a program may be a controller, a device, a system, a computer, a node, a storage system, a storage device, a server, a management computer, a client, or a host having a processor. The main unit (for example, a processor) of the process performed by executing a program may include a hardware circuit that performs some or all of the process. For example, the main unit of the process performed by executing a program may include a hardware circuit that executes encryption and decryption, or compression and decompression. The processor operates as a functional unit for realizing a predetermined function by operating according to a program. The device and system including the processor are the device and system including these functional units.

The program may be installed from a program source to a device such as a computer. The program source may be, for example, a program distribution server or a storage medium readable by a computer. In the case where the program source is a program distribution server, the program distribution server may include a processor (for example, a CPU) and a storage resource, and the storage resource may further store a distribution program and a program to be distributed. When the processor of the program distribution server executes the distribution program, the processor of the program distribution server may distribute the program to be distributed to other computers. In addition, in the following description, two or more programs may be realized as one program, or one program may be realized as two or more programs.

(1) System Configuration

FIG. 1 is a block diagram for showing a configuration example of a storage system 1 according to an embodiment of the present invention. The storage system 1 includes one or more storage nodes 10 and one or more IC hosts 20 (host devices). The storage system 1 may be operated on-premises or in a public cloud. It should be noted that in the following description, the storage node 10 will be simply referred to as a "node" in some cases.

Each storage node 10 and each IC host 20 are connected to each other via a storage service network 31. Specifically, the storage service network 31 is, for example, a fibre channel, Ethernet (registered trademark), InfiniBand, a wireless LAN (Local Area Network), or the like. In addition, the storage nodes 10 are connected to each other via a backend network 32. Specifically, the backend network 32 is, for example, a LAN, Ethernet, InfiniBand, a wireless LAN, or the like. It should be noted that the storage service network 31 and the backend network 32 may be configured by the same network, and each storage node 10 and each IC host 20 may be connected to a management network separately from the storage service network 31 and the backend network 32. Further, each of the networks may be redundant.

It should be noted that in the following description, the term "network" mainly refers to the backend network 32, but the embodiment is not necessarily limited thereto, and the storage service network 31 may be regarded as a "network", or the storage service network 31 and the backend network 32 may be collectively regarded as a "network". Specifically, for example, a "network delay value" to be described later may be a delay time (latency) of communications in the backend network 32, or a time (value) obtained by integrating the delay time of communications in each of the networks of the storage service network 31 and the backend network 32 by a predetermined method.

The IC host 20 is a general-purpose computer device functioning as a host (host device) for the storage node 10, and is also written as a compute node. It should be noted that the IC host 20 may be a virtual computer device such as a virtual machine. The IC host 20 reads and writes data from/into the storage node 10 via the storage service network 31 in response to a user operation or a request from an implemented application program.

The storage node 10 is a server device that provides the IC host 20 with a storage area for reading and writing data, and may be a general-purpose server or a dedicated machine. The storage node 10 may be a virtual machine. In addition, the storage node 10 may coexist with the same physical node as the IC host 20. In the embodiment, each storage node 10 is managed together with one or more other storage nodes 10 in a group called a cluster (see a cluster 40 in FIG. 1). Although FIG. 1 exemplifies a configuration in which one cluster 40 is set, a plurality of clusters 40 may be provided in the storage system 1.

Figure 2:
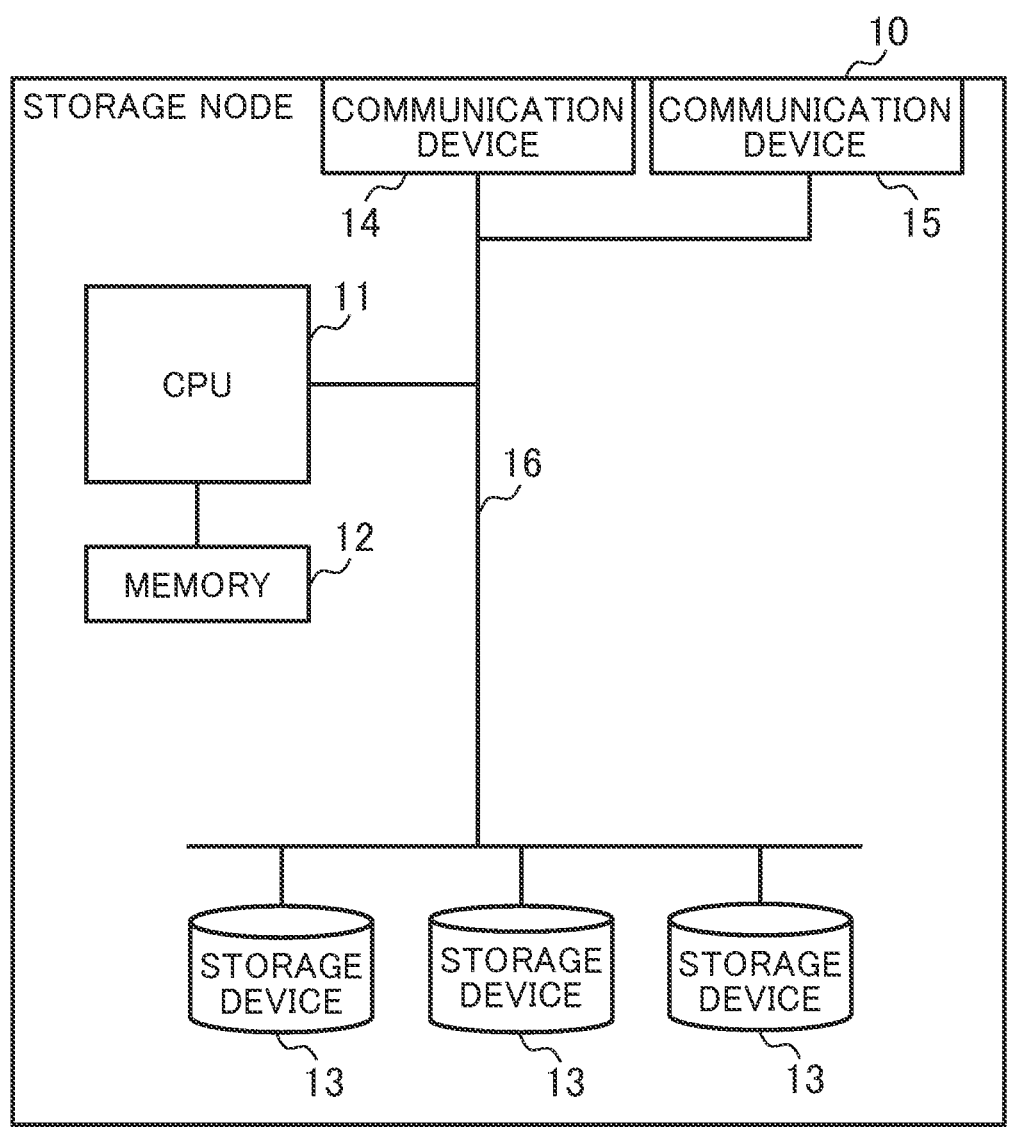
FIG. 2 is a block diagram for showing a hardware configuration example of a storage node 10.

FIG. 2 is a block diagram for showing a hardware configuration example of the storage node 10. As shown in FIG. 2, the storage node 10 is configured by connecting one or more CPUs (Central Processing Units) 11, one or more memories 12, one or more storage devices 13, and one or more communication devices 14 and 15 to each other via an internal network 16.

The CPU 11 is a processor that controls the operation of the entire storage node 10. Data of a write request received from the IC host 20 is processed by a storage function and stored in the storage device 13, or in response to a read request received from the IC host 20, data is read from the storage device 13 by using a storage function and processed to respond to the IC host 20. In addition, the memory 12 is configured using a volatile semiconductor memory such as SRAM (Static RAM (Random Access Memory)) or DRAM (Dynamic RAM) and a nonvolatile semiconductor memory, and is used as a work memory of the CPU 11 to temporarily hold various programs and necessary data. At least one or more CPUs 11 of the storage node 10 execute a program stored in the memory 12 to realize various processes of the storage node 10.

The storage device 13 is configured using a large-capacity nonvolatile storage device such as HDD (Hard Disk Drive), SSD (Solid State Drive), or SCM (Storage Class Memory), and is connected by an interface such as NVMe (Non-Volatile Memory Express), SAS (Serial Attached SCSI (Small Computer System Interface)), or SATA (Serial ATA (Advanced Technology Attachment)) to provide a storage area for reading and writing data in response to a read request or a write request from the IC host 20.

The communication device 14 is an interface used for the storage node 10 to communicate with the IC host 20 via the storage service network 31, and is configured using, for example, a fibre channel card, an Ethernet card, an InfiniBand card, a wireless LAN card, or the like. The communication device 14 performs protocol control during the communication with the IC host 20.

The communication device 15 is an interface used for the storage node 10 to communicate with the other storage nodes 10 via the backend network 32, and is configured using, for example, a fibre channel card, an Ethernet card, an InfiniBand card, a wireless LAN card, or the like. The communication device 15 performs protocol control during the communication with the other storage nodes 10.

Figure 3:
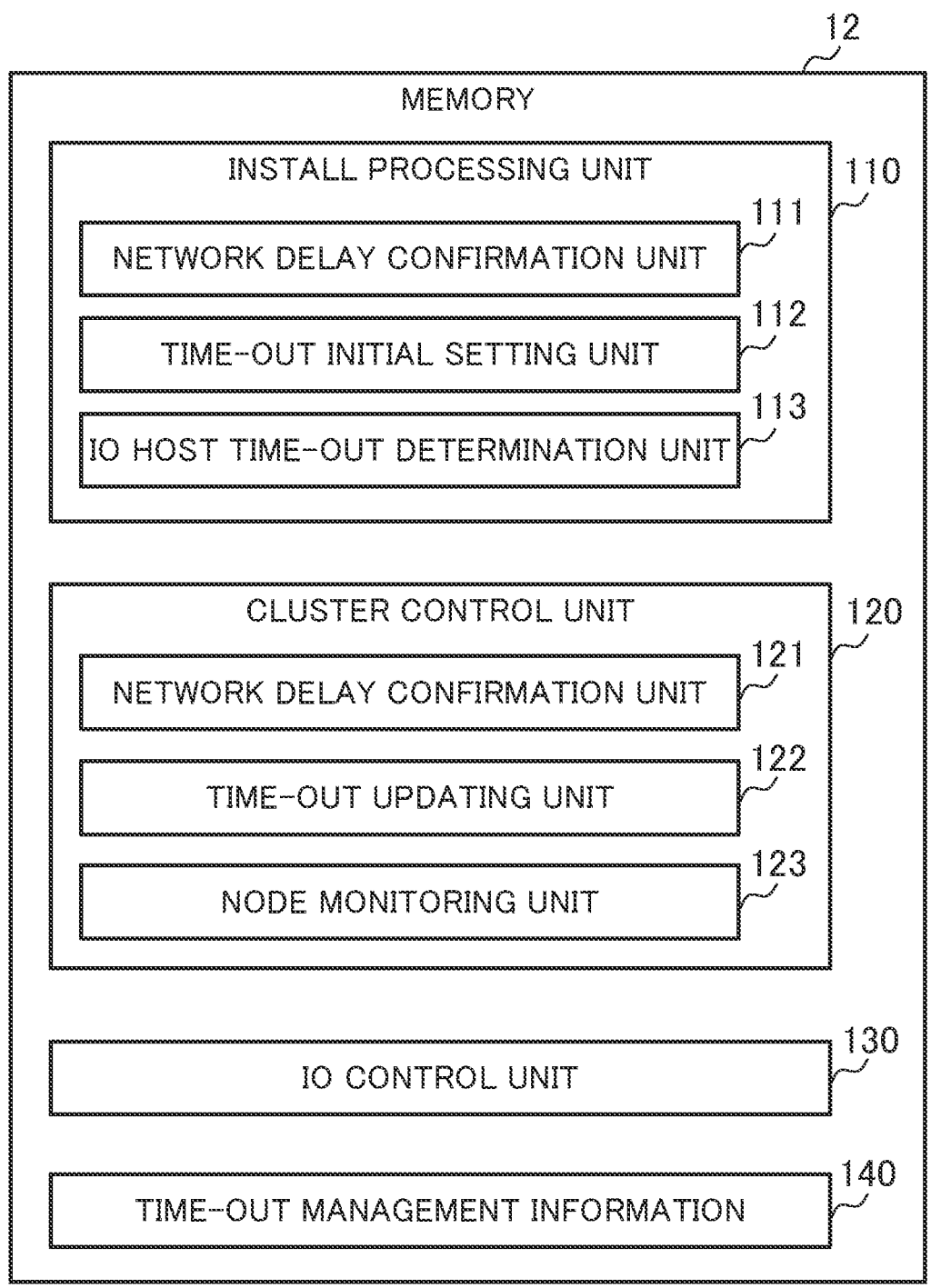
FIG. 3 is a block diagram for showing an example of programs and information stored in a memory 12.

FIG. 3 is a block diagram for showing an example of programs and information stored in the memory 12. As shown in FIG. 3, an install processing unit 110, a cluster control unit 120, an IC control unit 130, and time-out management information 140 are stored in the memory 12 of each storage node 10.

The install processing unit 110 performs an install process for initial setting (install) of the system. At the beginning of the install process, the install processing unit 110 executes a time-out initial setting process (FIG. 11) for setting a time-out value for a process during the install and a time-out value for a process during the operation.

In FIG. 3, as the respective units of the install processing unit 110, a network delay confirmation unit 111, a time-out initial setting unit 112, and an IC host time-out determination unit 113 are shown. The network delay confirmation unit 111 executes a network delay confirmation process (FIG. 12) for confirming the delay status of the network in the time-out initial setting process. In the time-out initial setting process, the time-out initial setting unit 112 executes a during-install time-out value updating process (FIG. 13) for setting time-out values of various processes during the install in the storage node 10 on the basis of the network delay status at the start of the install process. In addition, in the time-out initial setting process, the time-out initial setting unit 112 executes a during-operation time-out value updating process (FIG. 14) for setting time-out values of various processes (for example, node failure detection) during the operation in the storage node 10 on the basis of the network delay status at the start of the install process. In the time-out initial setting process, the IC host time-out determination unit 113 executes an IC host time-out requirement determination process (FIG. 15) for determining whether or not the initialized during-operation time-out value corresponds to an IC host time-out requirement. The IC host time-out requirement is a criterion of an IC error (input/output error) for stopping the reception of IC from the IC host 20, and it is determined as an IC error in the case where IC stops with the IC host 20 for more than the time specified in the requirement.

The cluster control unit 120 manages the entire cluster 40. The cluster control unit 120 executes a time-out updating process (FIG. 16) for updating the time-out value for the process during the operation, for example, periodically during the operation.

In FIG. 3, as the respective units of the cluster control unit 120, a network delay confirmation unit 121, a time-out updating unit 122, and a node monitoring unit 123 are shown. The network delay confirmation unit 121 executes a network delay confirmation process (FIG. 12) for confirming the delay status of the network in the time-out updating process. In the time-out updating process, the time-out updating unit 122 executes a storage operation status confirmation process (FIG. 17) for confirming the storage operation status during the operation. In addition, in the time-out updating process, the time-out updating unit 112 executes the during-operation time-out value updating process (FIG. 14) for setting the time-out values of various processes (for example, node failure detection) during the operation in the storage node 10 on the basis of the network delay status and the storage operation status during the operation. The node monitoring unit 123 executes a node monitoring process for constantly monitoring the state of the node apart from the time-out updating process. The node failure detection is included in the node monitoring process. In addition to the above processes, the cluster control unit 120 transfers an IC request received by the IC control unit 130 from the IC host 20 to the cluster control unit 120 of the corresponding storage node 10 via the backend network 32, and delivers the IC request transferred from the cluster control unit 120 of one of the other storage nodes 10 to the IC control unit 130.

The IC control unit 130 controls IC (input/output) of data. More specifically, when receiving a request (IC request) relating to read/write of data from the computer node (IC host 20), the IC control unit 130 performs IC processing corresponding to the request to read/write data from/into the storage device 13, and returns the response to the computer node.

Figure 4:
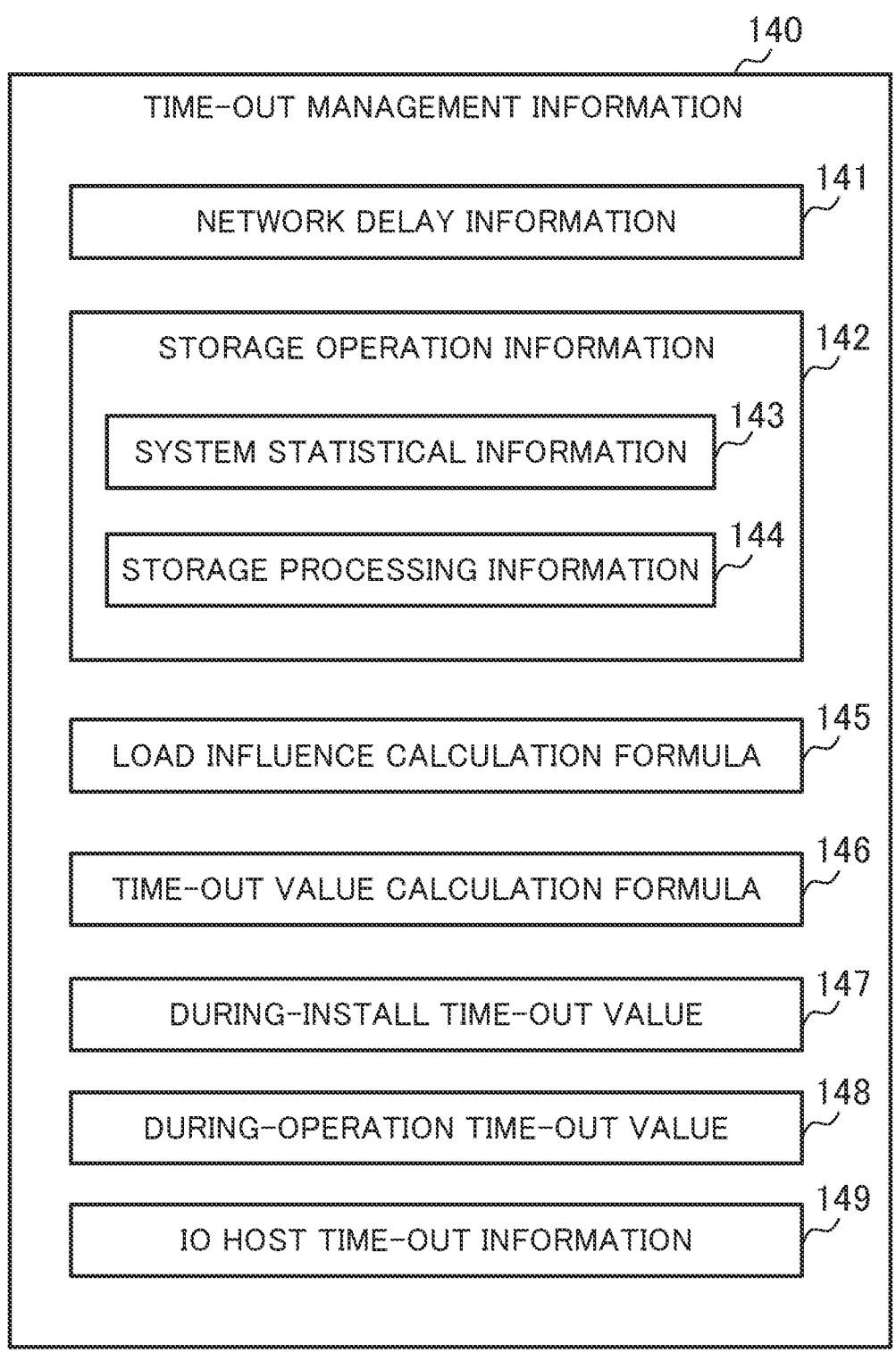
FIG. 4 is a diagram for explaining a breakdown of time-out management information 140.

The time-out management information 140 is information for determining or managing time-out values of various predetermined processes (for example, node failure detection) in the storage node 10. As shown in FIG. 4 to be described later, the time-out management information 140 includes a plurality of pieces of information.

In addition, the cluster control unit 120 may include an IC host time-out determination unit that executes an IC host time-out requirement determination process as similar to the IC host time-out unit 113 of the install processing unit 110.

It should be noted that although not shown in FIG. 3, the memory 12 also holds management information (for example, a logical/physical conversion table and the like) necessary for various kinds of storage control in the storage system 1 (or the storage node 10) such as thin provisioning, hierarchical control, snapshot, compression, deduplication, or remote copying.

(2) Time-Out Management Information 140

Hereinafter, the time-out management information 140 held in the memory 12 will be described in detail.

FIG. 4 is a diagram for explaining a breakdown of the time-out management information 140. The time-out management information 140 is information to be referred to, updated, or registered when each unit shown in FIG. 3 executes a process. As shown in FIG. 4, the time-out management information 140 has network delay information 141, storage operation information 142 including system statistical information 143 and storage processing information 144, a load influence calculation formula 145, a time-out value calculation formula 146, a during-install time-out value 147, a during-operation time-out value 148, and IC host time-out information 149.

Details of the network delay information 141, the system statistical information 143, the storage processing information 144, the during-install time-out value 147, the during-operation time-out value 148, and the IC host time-out information 149 will be described later with reference to concrete examples shown in FIG. 5 to FIG. 10.

The load influence calculation formula 145 and the time-out value calculation formula 146 are calculation formulas used for calculating a time-out value (an operation environment adaptive value to be described later) adaptive to the current operation environment on the basis of a measured value (current value) in the system being operated.

Specifically, the load influence calculation formula 145 is a formula for calculating, for each element that affects the network quality, the values (a fundamental coefficient and a fundamental addition value) of parameters representing the degree of influence of the current value of the element on the network quality (load). In the embodiment, the install processing unit 110 and the cluster control unit 120 determine the current network quality by calculating the load influence (the fundamental coefficient and the fundamental addition value) due to the current value of each element using such a load influence calculation formula 145. Then, the parameter values calculated from the load influence calculation formula 145 are input to the time-out value calculation formula 146. Although an example of a concrete calculation formula is omitted, it is assumed that the load influence calculation formula 145 is determined in advance by a load test at the time of system design or install, and may be a calculation formula different for each element.

It should be noted that in the following description, the fundamental coefficient and the fundamental addition value calculated by the load influence calculation formula 145 may be written as "fundamental coefficient c" and "fundamental addition value a", and further are written by adding the ID (corresponding to the IDs 1411, 1431, and 1441 in FIG. 5 to FIG. 7 to be described later) of the "element" used for the calculation so that it is possible to distinguish which element the fundamental coefficient and the fundamental addition value are used for. Specifically, for example, in the case where the current value of the network delay information 141 to which the ID "1" is assigned is calculated by the load influence calculation formula 145, a fundamental coefficient c1 and a fundamental addition value a1 are obtained.

The time-out value calculation formula 146 is a formula for determining the operation environment adaptive value to be updated from the default value of the time-out value, and is a formula for calculating the time-out value (the operation environment adaptive value to be described later) adaptive to the current operation environment for each process P (P is arbitrary) using the information (the fundamental coefficient c and the fundamental addition value a) calculated by the load influence calculation formula 145. As an example, the time-out value calculation formula 146 is represented by the following formula 1.

[Formula 1]

time-out value of process $P$=time-out default value of process $P\times\max(c1,\ldots,c4)+\max(a1,\ldots,a4)$ \hfill (Formula 1)

In Formula 1, the "time-out default value" is a time-out value defined as a default value, and the "time-out value" to be calculated is the operation environment adaptive value. In addition, Formula 1 is an example, and another calculation formula may be used for the time-out value calculation formula 146. Specifically, "max (c1, . . . , c4)" in Formula 1 may be, for example, "c1×c2×c3×c4", and "max (a1, . . . , a4)" in Formula 1 may be, for example, "a1+a2+a3+a4". In addition, the fundamental coefficient and the fundamental addition value may be prepared for each process P, or different calculation formulas may be prepared for each process P.

It should be noted that in the storage node 10 according to the embodiment, the time-out management information 140 may be stored not only in the memory 12 but also in the storage device 13. In such a case, for example, the during-operation time-out value 148 is stored in the storage device 13, so that even in the case where the cluster 40 is stopped, the during-operation time-out value 148 can be referred to from the storage device 13 and used at the time of next startup.

Figure 5:
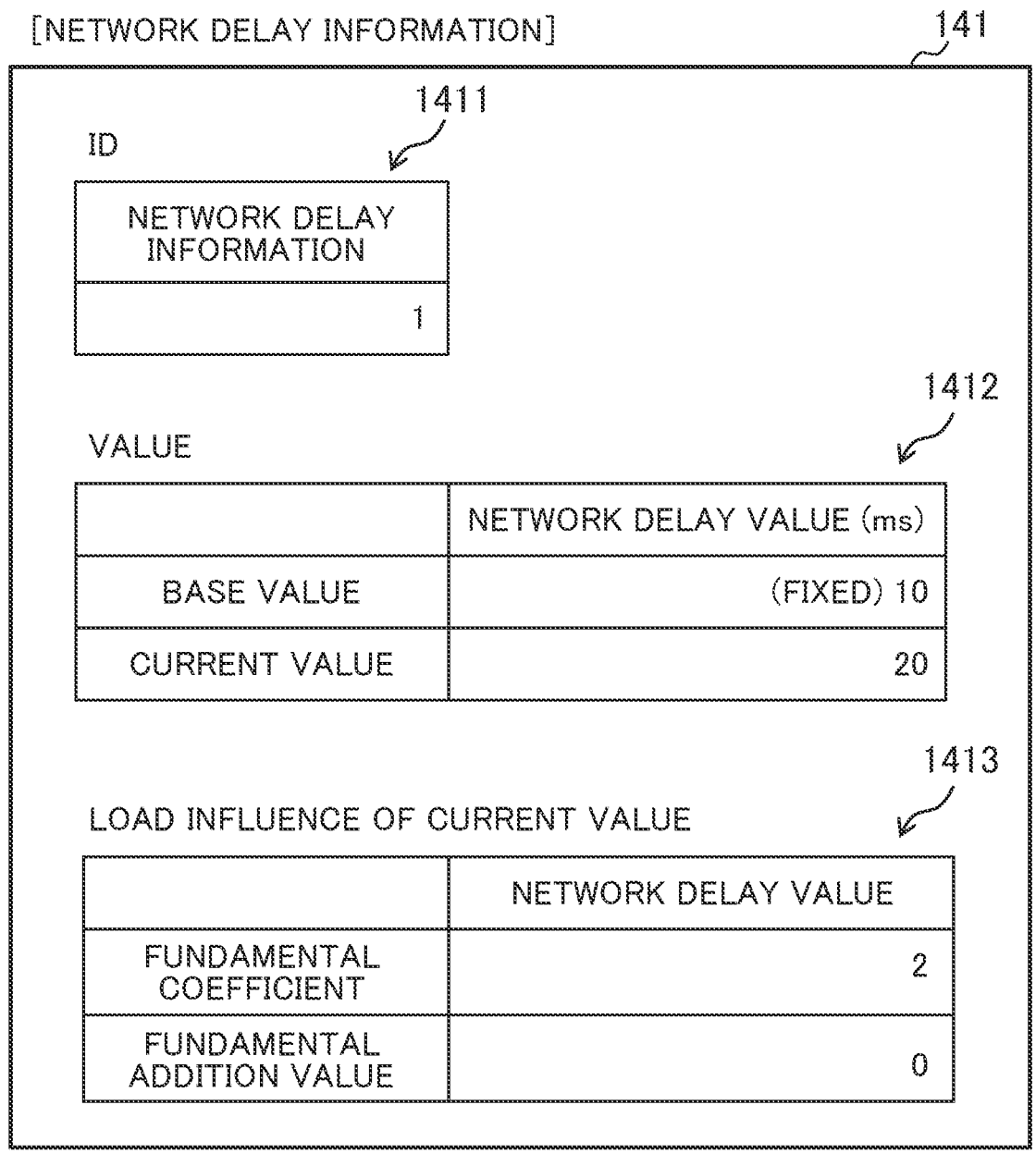
FIG. 5 is a diagram for showing an example of network delay information 141.

FIG. 5 is a diagram for showing an example of the network delay information 141. The network delay information 141 stores information relating to a network delay value indicating the degree of delay of the network. The network delay information 141 exemplified in FIG. 5 includes an ID 1411, a value 1412, and a load influence of current value 1413.

The ID 1411 is an identifier for identifying the network delay information 141, and it is assumed that the ID "1" is assigned in the embodiment.

The value 1412 is information indicating a base value and a current value of the network delay value. In the base value of the value 1412, the delay value in the network assumed at the time of the system design is set to a fixed value. In addition, the current value of the value 1412 is updated in the network delay confirmation process executed by the network delay confirmation units 111 and 121 during the install and operation.

The load influence of current value 1413 holds parameter values (the fundamental coefficient c1 and the fundamental addition value a1) indicating the load influence by the current value (the current value of the value 1412) of the network delay value. Each of the above-described parameter values is calculated using the load influence calculation formula 145 when calculating the during-install time-out value 147 or the during-operation time-out value 148, and is stored in the load influence 1413.

FIG. 6 is a diagram for showing an example of the system statistical information 143. The system statistical information 143 is one of the storage operation information 142 for storing dynamic operation information in the storage node 10 being operated, and stores statistical information of the system such as IC performance and a packet amount. The system statistical information 143 exemplified in FIG. 6 includes an ID 1431, a value 1432, and a load influence of current value 1433. It should be noted that FIG. 6 is an example, and the system statistical information 143 may hold information of statistical elements other than the IC performance and the packet amount. The IC performance is an index indicating the performance of processing the IC requested from the IC host 20, and the packet amount is an index indicating the data communication amount in the storage node 10.

The ID 1431 is an identifier for identifying information of each statistical element (the IC performance and the packet amount) held by the system statistical information 143, and it is assumed that the ID "2" is assigned to the IC performance and the ID "3" is assigned to the packet amount in the embodiment.

The value 1432 is information indicating the base value and the current value of each statistical element. In the base value of the value 1432, the IC performance and the packet amount assumed at the time of the system design are set to fixed values. In addition, the current value of the value 1432 is updated by the cluster control unit 120 and the IC control unit 130 during the operation of the system.

The load influence of current value 1433 holds parameter values (a fundamental coefficient c2 and a fundamental addition value a2 for the IC performance and a fundamental coefficient c3 and a fundamental addition value c3 for the packet amount) indicating the load influence by the current value (the current value of the value 1432) of each statistical element. Each of the above-described parameter values is calculated using the load influence calculation formula 145 when calculating the during-operation time-out value 148 and is stored in the load influence 1433.

Figure 7:
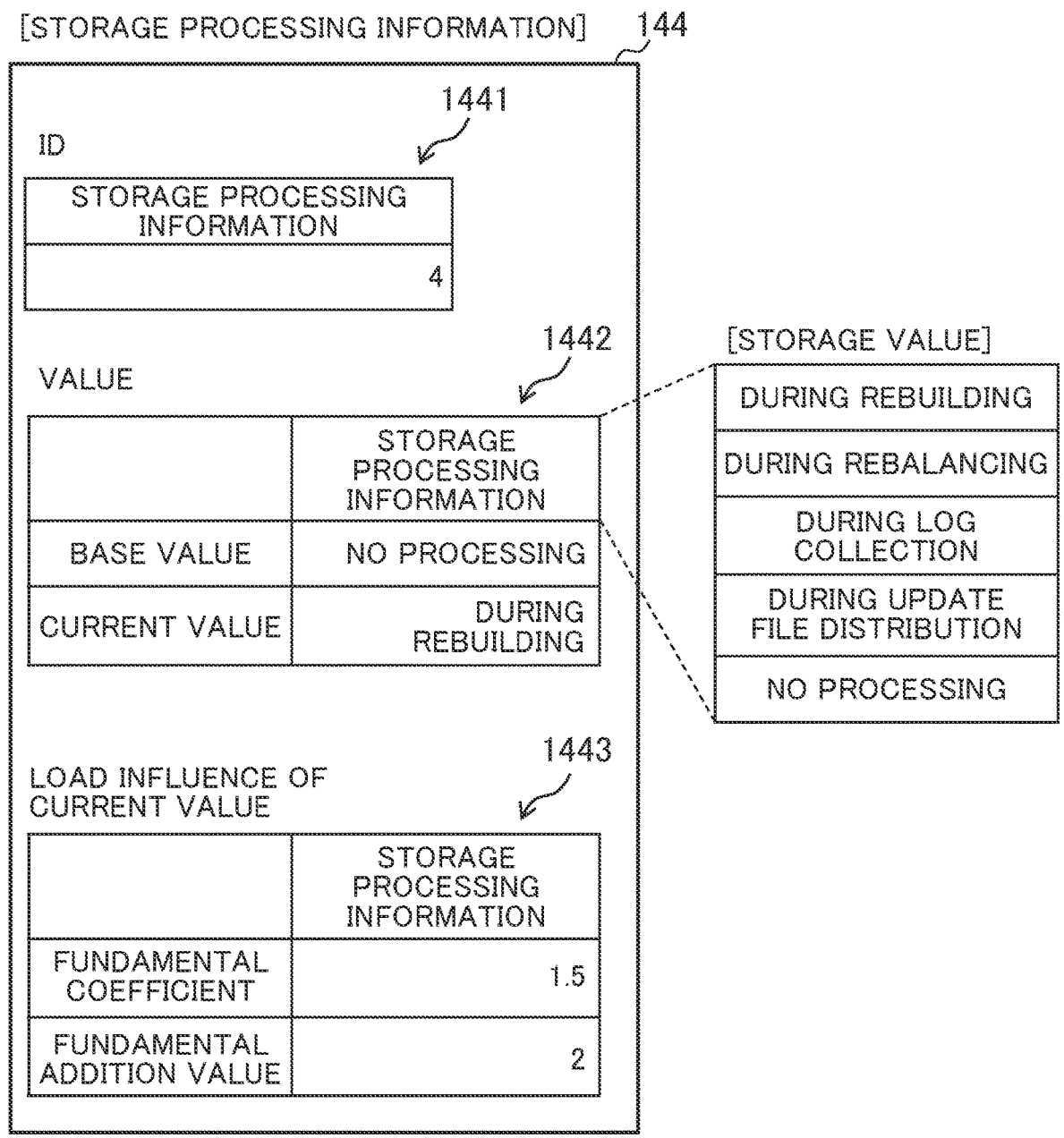
FIG. 7 is a diagram for showing an example of storage processing information 144.

FIG. 7 is a diagram for showing an example of the storage processing information 144. The storage processing information 144 stores information relating to the execution status of a predetermined storage process (hereinafter, also referred to as a heavy network load storage process) in which an increase in the network load is estimated. The storage processing information 144 exemplified in FIG. 7 includes an ID 1441, a value 1442, and a load influence of current value 1443.

The ID 1441 is an identifier for identifying the storage processing information 144, and it is assumed that the ID "4" is assigned in the embodiment.

The value 1442 is information indicating the base value and the current value of a storage process having a relatively heavy network load being executed in the storage node 10. In the base value of the value 1442, "no processing" is set as the initial predetermined value. In addition, the current value of the value 1442 is appropriately updated during the operation of the system by the cluster control unit 120. The storage process set to the current value of the value 1442 is selected from a plurality of previously prepared storage values. In the storage processing information 144 of FIG. 7, "during rebuilding", "during rebalancing", "during log collection", and "during update file distribution" are prepared in the storage values as the storage processes having a relatively heavy network load, and further "no processing" is prepared as a storage value to be selected in the case where none of the storage processes is executed. It should be noted that the storage values shown in FIG. 7 are examples, and storage processes other than those illustrated may be held in the storage values.

The load influence of current value 1443 holds parameter values (a fundamental coefficient c4 and a fundamental addition value a4) indicating the load influence by the heavy network load storage process (the current value of the value 1442) currently being executed. Each of the above-described parameter values is calculated using the load influence calculation formula 145 when calculating the during-operation time-out value 148 and is stored in the load influence 1433.

FIG. 8 is a diagram for showing an example of the during-install time-out value 147. The during-install time-out value 147 stores time-out values of various processes during the install executed during the install. The process during the install may be regarded as a process included in the above-described install process, and for example, a process for distributing a file to each storage node or the like can be specifically mentioned.

The during-install time-out value 147 holds a default value and an operation environment adaptive value for each process during the install to be stored. The default value is a time-out value as a predetermined value determined at the stage of the system design, and for example, the base value of the value 1412 of the network delay information 141 is determined as the premise of the network load. It should be noted that the default value may be updated in the middle of the operation of the system in response to the update of the system or command execution. The operation environment adaptive value is a time-out value adapted to the actual system operation environment. The operation environment adaptive value is determined by the time-out initial setting unit 112 on the basis of the network delay information 141 and the storage operation information 142. That is, the default value is initially used for the during-install time-out value 147, but the latest value is used after the operation environment adaptive value is calculated. In FIG. 8, as an example, the time-out values in a process A during the install and a process B during the install are shown, but the during-install time-out value 147 may store the respective time-out values for other processes during the install.

FIG. 9 is a diagram for showing an example of the during-operation time-out value 148. The during-operation time-out value 148 stores time-out values of various processes during the operation executed during the system operation. In addition to the illustrated processes, for example, a process for inquiring between the storage nodes, or the like can be mentioned as the process during the operation.

As similar to the during-install time-out value 147 shown in FIG. 8, the during-operation time-out value 148 holds a default value and an operation environment adaptive value for each process to be stored. The details of the default value and the operation environment adaptive value will be omitted because most of the details are the repetition of the description of FIG. 8. However, as a difference from the during-install time-out value 147, the operation environment adaptive value of the during-operation time-out value 148 is determined by the time-out updating unit 122. Although FIG. 9 shows time-out values in node failure detection, FO processing, and a process c during the operation as an example, the during-operation time-out value 148 may store the respective time-out values for other processes during the operation. It should be noted that the "node failure detection" in FIG. 9 is a process for detecting a node failure, and the "FO processing" is a process for performing failover (FO) to switch to a standby system in the case where a failure such as a node failure that makes it difficult to continue the operation of an operating system occurs. In the embodiment, in the case where a node failure occurs, another storage node in the cluster 40 takes over the process and performs failover.

FIG. 10 is a diagram for showing an example of the IO host time-out information 149. The IO host time-out information 149 stores information of a time-out requirement of IO (to be referred to as an IO host time-out requirement in the embodiment) as a criterion for determining an IO error that stops the acceptance of IO from the IO host 20 to the storage node 10. As for the IO host time-out requirement, for example, a user (for example, an administrator of the storage system 1) inputs a time-out period at the start of the install process, and the install processing unit 110 stores the input value in the IO host time-out information 149. In addition, the IC host time-out information 149 may be changed in response to an input from the user in the middle of the operation.

(3) Process

Hereinafter, as for the processes for setting the time-out value executed in the storage system 1 (storage node 10) according to the embodiment, the time-out initial setting process executed at the beginning of the install process and the time-out updating process executed periodically during the operation of the system will be described in detail.

(3-1) Time-Out Initial Setting Process

Figure 11:
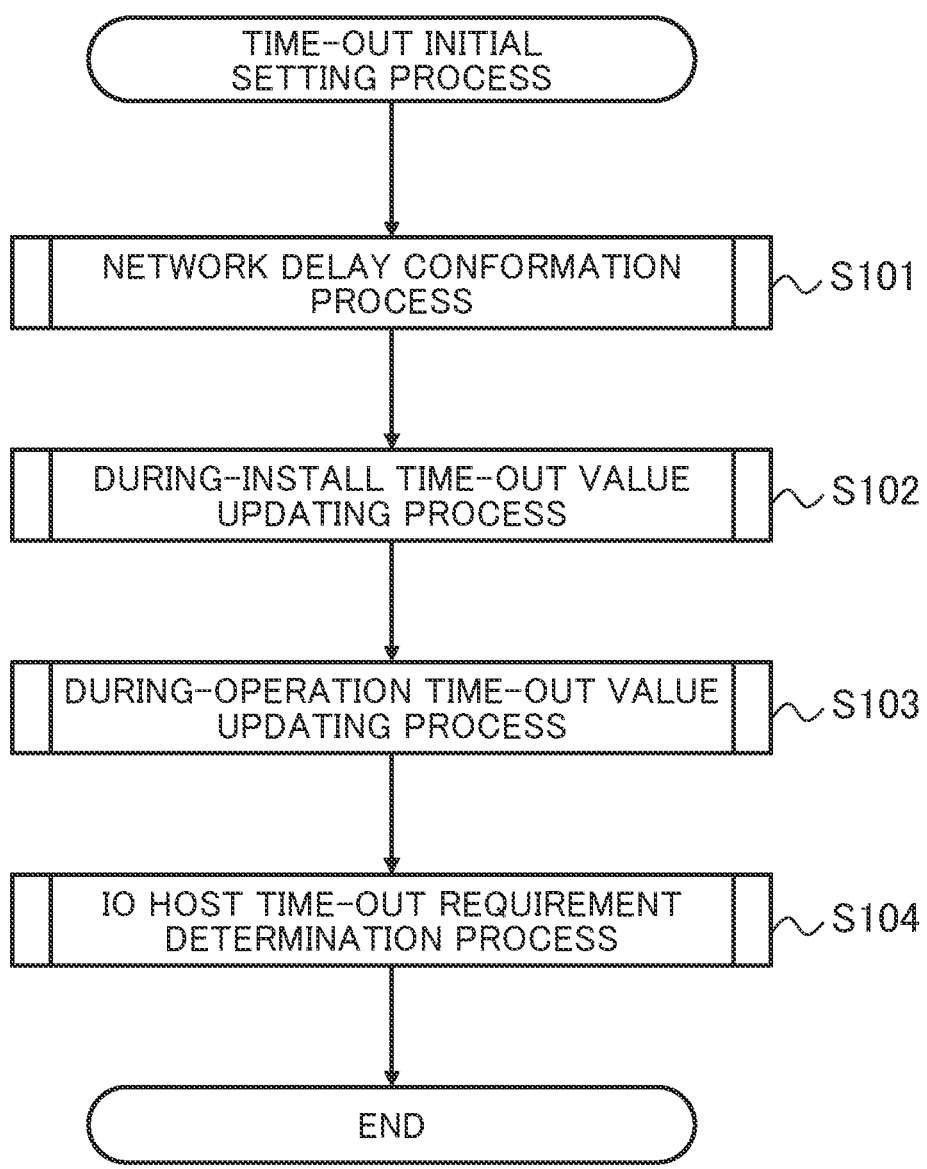
FIG. 11 is a flowchart for showing a processing procedure example of a time-out initial setting process.

FIG. 11 is a flowchart for showing a processing procedure example of the time-out initial setting process. The time-out initial setting process is the process executed first in the install process executed for initializing (installing) the system in the storage system 1, and is executed by the respective units of the install processing unit 110 shown in FIG. 3.

According to FIG. 11, the network delay confirmation unit 111 first executes the network delay confirmation process for confirming the delay status of the network in the operation environment (Step S101). Although the details thereof will be described later with reference to FIG. 12, in the network delay confirmation process, the network delay confirmation unit 111 measures the current value of the network delay value, calculates the load influence by the measured current value, and stores the current value and the load influence in the network delay information 141.

Next, the time-out initial setting unit 112 executes the during-install time-out value updating process for updating the during-install time-out value 147 (Step S102). Although the details thereof will be described later with reference to FIG. 13, in the during-install time-out value updating process, the time-out initial setting unit 112 calculates the during-install time-out value (operation environment adaptive value) adapted to the system operation environment on the basis of the load influence of the current value stored in the network delay information 141 updated in Step S101, and updates the during-install time-out value 147 on the basis of the calculation result.

Next, the time-out initial setting unit 112 executes the during-operation time-out value updating process for updating the during-operation time-out value 148 (Step S103). Although the details thereof will be described later with reference to FIG. 14, in the during-operation time-out value updating process, the time-out initial setting unit 112 calculates the during-operation time-out value (operation environment adaptive value) adapted to the system operation environment on the basis of the network delay information 141 updated in Step S101 and the load influence of the current value stored in the storage operation information 142, and updates the during-operation time-out value 148 on the basis of the calculation result.

Finally, the IO host time-out determination unit 113 executes the IO host time-out requirement determination process (Step S104), and terminates the time-out initial setting process. Although the details thereof will be described later with reference to FIG. 15, in the IO host time-out requirement determination process, the IO host time-out determination unit 113 compares and determines the processing time (FO time) of the entire failover in the case where the operation environment adaptive value set in Step S103 is applied with the IC host time-out requirement set in the IO host time-out information 149, and determines in advance during the install process whether or not to be in the setting in which an IO error may occur due to erroneous node failure detection. For example, if the IO host time-out is set too short, an IO error is likely to occur.

It should be noted that in the above-described time-out initial setting process, the during-install time-out value and the during-operation time-out value are determined and set in Step S102 and Step S103 on the basis of the network delay information 141 (the current value of the network delay value) updated in Step S101, but as a modified example of the time-out initial setting process in the embodiment, not only the current value of the network delay value but also other confirmation elements such as the disk access performance in the storage device 13 may be added, and the during-install time-out value and the during-operation time-out value may be determined and set on the basis of these confirmation elements.

Figure 12:
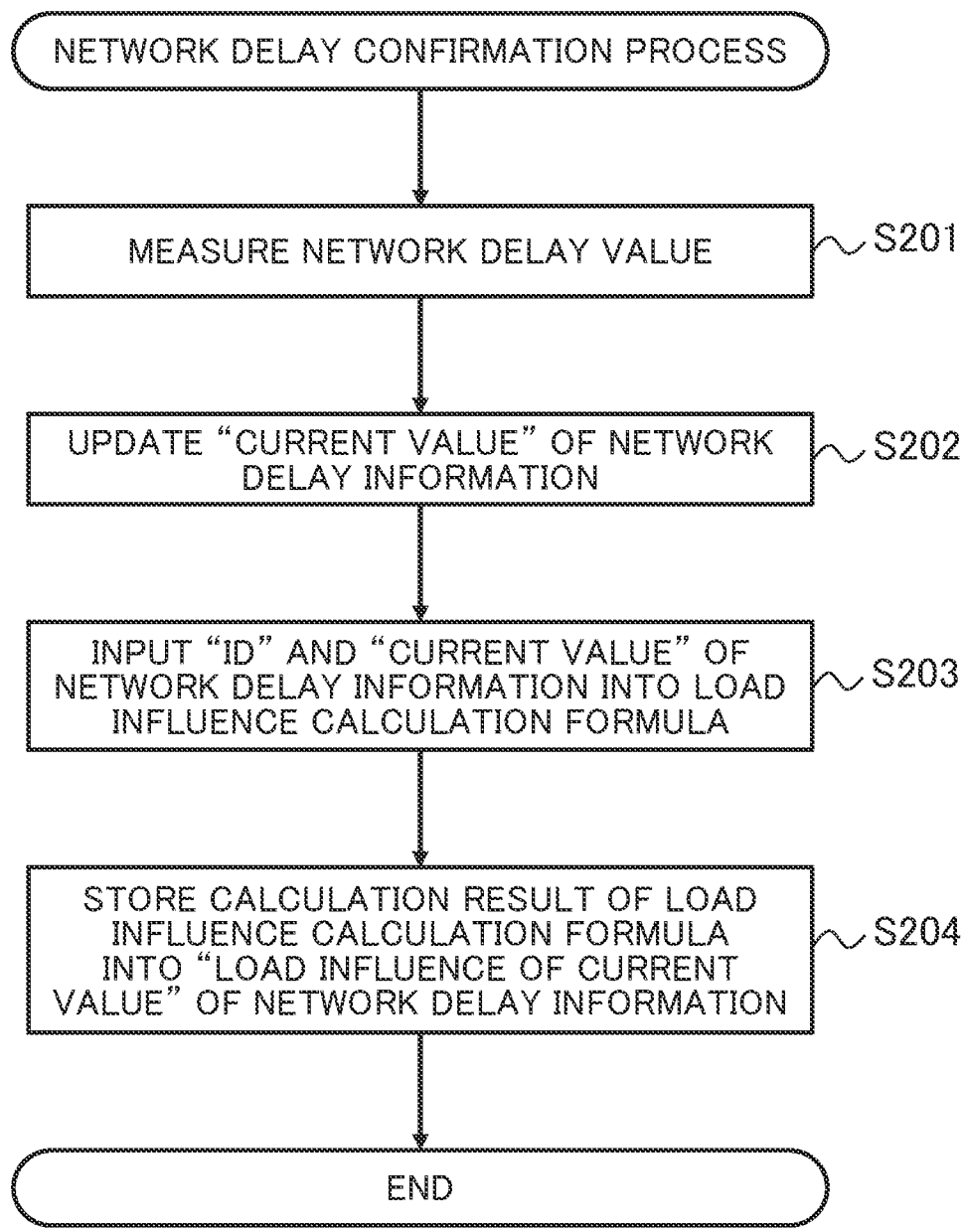
FIG. 12 is a flowchart for showing a processing procedure example of a network delay confirmation process.
Figure 16:
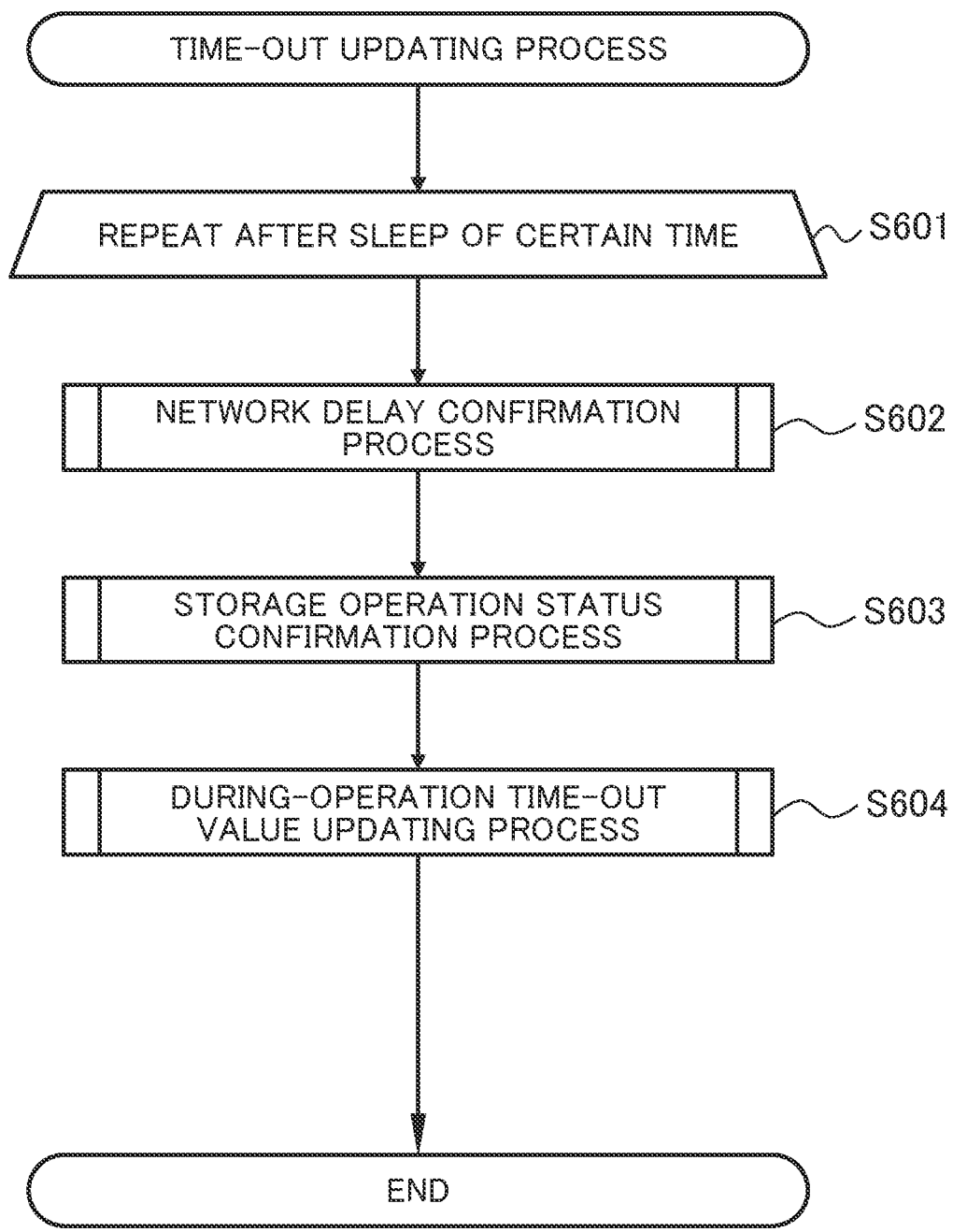
FIG. 16 is a flowchart for showing a processing procedure example of a time-out updating process.

FIG. 12 is a flowchart for showing a processing procedure example of the network delay confirmation process. The network delay confirmation process shown in FIG. 12 corresponds to Step S101 of FIG. 11, and also corresponds to the process of Step S602 of the time-out updating process described later in FIG. 16. Step S101 in FIG. 11 is executed by the network delay confirmation unit 111, and Step S602 in FIG. 16 is executed by the network delay confirmation unit 121. Hereinafter, a processing procedure of the network delay confirmation process will be described with the network delay confirmation unit 111 as a main processing unit.

According to FIG. 12, the network delay confirmation unit 111 first measures a network delay value indicating the degree of delay of the network (Step S201), and updates the "current value" of the value 1412 of the network delay information 141 with the measured network delay value. The network delay value can be obtained, for example, from the delay time measured when a ping command is transmitted to the target network. In the case of the network delay information 141 in FIG. 5, a network delay value of "20 ms" is measured, and this value is stored in the "current value" of the value 1412.

Next, the network delay confirmation unit 111 inputs the ID 1411 "1" and the current value "20" of the value 1412 in the network delay information 141 updated in Step S202 to the load influence calculation formula 145, and calculates the fundamental coefficient and the fundamental addition value (Step S203). Then, the network delay confirmation unit 111 updates the load influence of current value 1413 of the network delay information 141 according to the calculation result in Step S203 (Step S204), and terminates the network delay confirmation process. In the case of the network delay information 141 in FIG. 5, the calculation results of the fundamental coefficient c1 "2" and the fundamental addition value a1 "0" are obtained from the load influence calculation formula 145, and these values are stored in the load influence of current value 1413.

Figure 13:
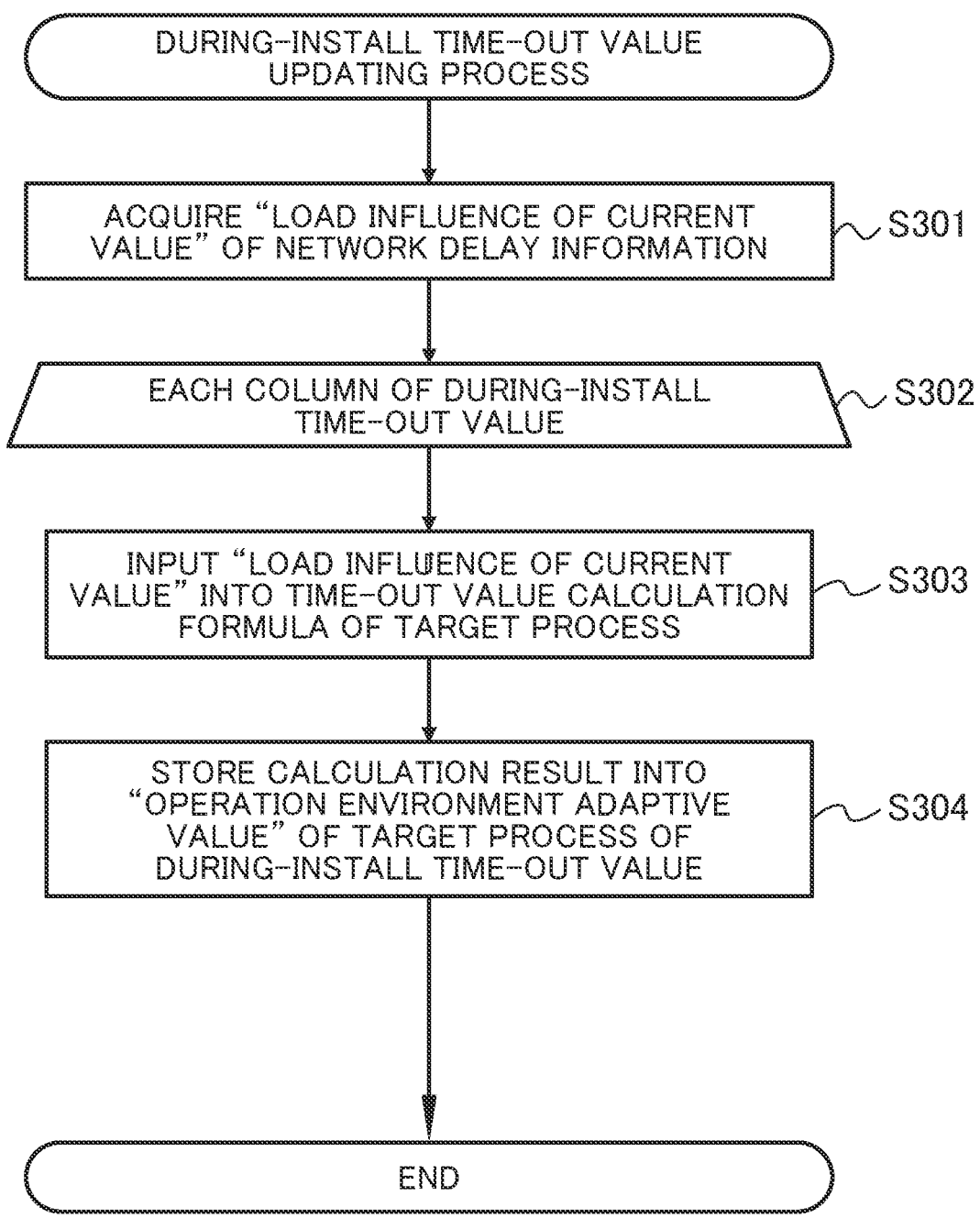
FIG. 13 is a flowchart for showing a processing procedure example of a during-install time-out value updating process.

FIG. 13 is a flowchart for showing a processing procedure example of the during-install time-out value updating process. The during-install time-out value updating process shown in FIG. 13 corresponds to the process of Step S102 in FIG. 11 and is executed by the time-out initial setting unit 112.

According to FIG. 13, the time-out initial setting unit 112 first acquires the values (the fundamental coefficient c1 "2" and the fundamental addition value a1 "0") of the load influence of current value 1413 from the network delay information 141 updated in the network delay confirmation process (Step S301).

Next, the time-out initial setting unit 112 starts the loop process of Steps S303 to S304 for each column (that is, each process during the install) of the during-install time-out value 147 (Step S302).

In Step S303, the time-out initial setting unit 112 inputs the value of the load influence of current value 1413 acquired in Step S301 to the time-out value calculation formula 146 of the process corresponding to the column selected in Step S302, and calculates the time-out value of the operation environment adaptive value. Then, in Step S304, the time-out initial setting unit 112 stores the calculation result in Step S303 in the operation environment adaptive value of the during-install time-out value 147.

Here, the processes of Steps S303 to S304 will be concretely described for the "process A during the install" shown in the during-install time-out value 147 of FIG. 8 by using the time-out value calculation formula 146 of Formula 1.

The default value of the process A during the install is "5", the fundamental coefficient c1 acquired in Step S301 is "2", and the fundamental addition value a1 is "0". Therefore, when these values are input to the time-out value calculation formula 146 of Formula 1 in Step S303, "time-out value of process A during the install=time-out default value of process A during the install×max (2)+max (0)=5×2+0=10" is calculated. As a supplementary explanation of the above-described calculation, the other fundamental coefficients c2, c3, and c4 and the fundamental addition values a2, a3, and a4 do not have values at the time when the during-install time-out value updating process is performed because the operation is not performed yet. In addition, even if they have default values, these parameter values are not used in the during-install time-out value updating process.

Therefore, as a result of the calculation in Step S303, "10" is stored in the operation environment adaptive value of the process A during the install of the during-install time-out value 147 in Step S304.

It should be noted that as a derived example, an allowable range of values may be defined in advance for the operation environment adaptive value (time-out value) for each process in the storage node 10. In this case, the maximum value and the minimum value of the allowable range may be set in advance, and for example, the maximum value and the minimum value may be stored separately from the default value in each column of the during-install time-out value 147 in FIG. 8 and the during-operation time-out value 148 in FIG. 9. In the case where the calculation result in Step S303 does not fall within the allowable range when the allowable range of the operation environment adaptive value is defined, the time-out initial setting unit 112 employs the maximum value or the minimum value that is closer to the calculation result, and stores the same in the operation environment adaptive value in Step S304. Such a derived example is similarly applicable to Step S405 of FIG. 14 to be described later, but a detailed description thereof will be omitted in Step S405.

After the process of Step S304, the time-out initial setting unit 112 similarly performs the processes of Steps S303 to S304 for the process B during the install. As described above, by executing the loop process of Steps S303 to S304 for all the columns of the during-install time-out value 147, the time-out value of the operation environment adaptive value can be calculated for all the target processes during the install, and the during-install time-out value 147 can be updated. Then, when the loop process is completed for all the columns, the time-out initial setting unit 112 terminates the during-install time-out value updating process.

Figure 14:
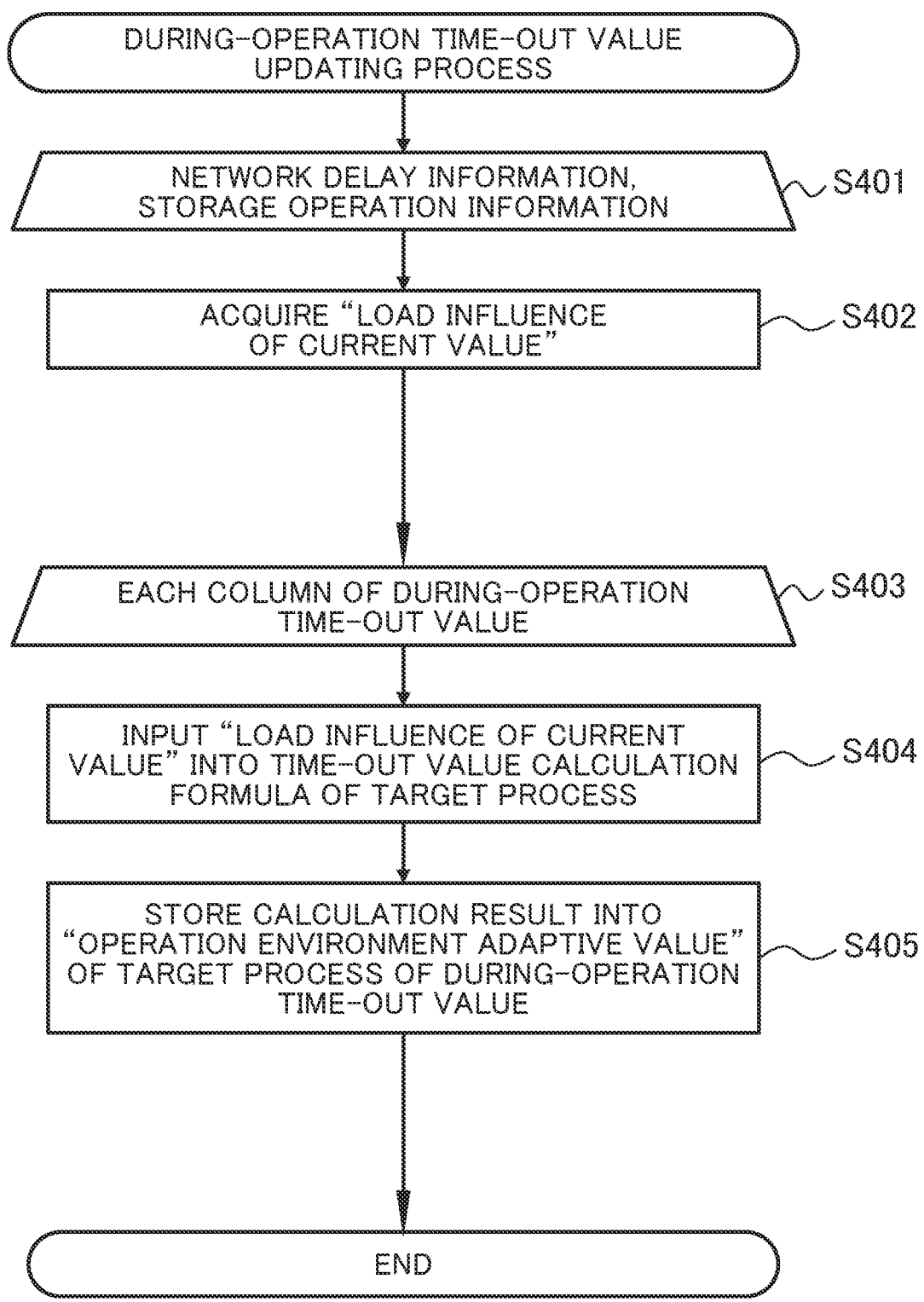
FIG. 14 is a flowchart for showing a processing procedure example of a during-operation time-out value updating process.

FIG. 14 is a flowchart for showing a processing procedure example of the during-operation time-out value updating process. The during-operation time-out value updating process shown in FIG. 14 corresponds to the process of Step S103 of FIG. 11, and also corresponds to the process of Step S604 of the time-out updating process described later in FIG. 16. Step S103 in FIG. 11 is executed by the time-out initial setting unit 112, and Step S604 in FIG. 16 is executed by the time-out updating unit 122. Hereinafter, a processing procedure of the during-operation time-out value updating process will be described with the time-out initial setting unit 112 as a main processing unit.

According to FIG. 14, the time-out initial setting unit 112 first refers to the network delay information 141 and the storage operation information 142 (the system statistical information 143 and the storage processing information 144) (Step S401), and acquires the values of the load influences of current values 1413, 1433, and 1443 stored in the respective pieces of information (Step S402). However, since the system is not in operation in the during-operation time-out value updating process executed by the time-out initial setting unit 112, values are not stored in the current value and the load influence thereof in the storage operation information 142, and the values are not acquired (or are not acquired even if the default values are set). Therefore, specifically, in the case of the network delay information 141 in FIG. 5, the fundamental coefficient c1 "2" and the fundamental addition value a1 "0" are acquired for the network delay value.

Next, the time-out initial setting unit 112 starts the loop process of Steps S404 to S405 for each column (that is, each process during the operation including the node failure detection and the FO processing) of the during-operation time-out value 148 (Step S403).

In Step S404, the time-out initial setting unit 112 inputs the values of the load influences of current values 1413, 1433, and 1443 acquired in Step S402 to the time-out value calculation formula 146 of the process corresponding to the column selected in Step S403, and calculates the time-out value of the operation environment adaptive value. Then, in Step S405, the time-out initial setting unit 112 stores the calculation result in Step S403 in the operation environment adaptive value of the during-operation time-out value 148. It should be noted that since the load influence of current value of the storage operation information 142 is not acquired in the during-operation time-out value updating process executed by the time-out initial setting unit 112 as described above in Step S402, only the value of the load influence of current value 1413 is actually input to the time-out value calculation formula 146 in Step S404. That is, in the stage of the time-out initial setting, the during-operation time-out value is calculated on the basis of the network delay information.

Here, using the time-out value calculation formula 146 of Formula 1 described above, the processes of Steps 404 to S405 will be specifically described for the "node failure detection" shown in the during-operation time-out value 148 of FIG. 9. First, the default value of the node failure detection is "4", and as the values of the load influence of current value 1413 acquired in Step S402, the fundamental coefficient c1 is "2" and the fundamental addition value a1 is "0" (in the case of the load influence of current value 1413 in FIG. 5). Therefore, when these values are input to the time-out value calculation formula 146 of Formula 1 in Step S404, "time-out value of node failure detection=time-out default value of node failure detection×max (2)+max (0)=4× 2+0=8" is calculated. As a supplementary explanation of the above-described calculation, the other fundamental coefficients c2, c3, and c4 and the fundamental addition values a2, a3, and a4 do not have values at the time when the during-operation time-out value updating process is performed in the time-out initial setting process because the operation is not performed yet. In addition, even if they have default values, these parameter values are not used in the during-operation time-out value updating process at this stage.

Therefore, as a result of the above-described calculation in Step S404, "8" is stored in the operation environment adaptive value of the node failure detection of the during-operation time-out value 148 in Step S405. That is, "8" is used as the time-out value of the node failure detection in the operation environment. It should be noted that as similar to the derived example described in the description of Step S304 of FIG. 13, an allowable range may be preliminarily defined for the operation environment adaptive value (time-out value) for each process even in Step S405, and in this case, in the case where the calculation result of Step S404 does not fall within the allowable range, the maximum value or the minimum value closer to the calculation result may be employed and stored in the operation environment adaptive value.

Then, after the process in Step S405, the time-out initial setting unit 112 similarly performs the processes of Steps S404 to S405 for other processes (for example, the FO processing and the process C during the operation) targeted in the during-operation time-out value 148, so that the time-out value of the operation environment adaptive value can be calculated for all the processes during the operation targeted in the during-operation time-out value 148 and the during-operation time-out value 148 can be updated. Then, when the loop process is completed for all the columns, the time-out initial setting unit 112 terminates the during-operation time-out value updating process.

Figure 15:
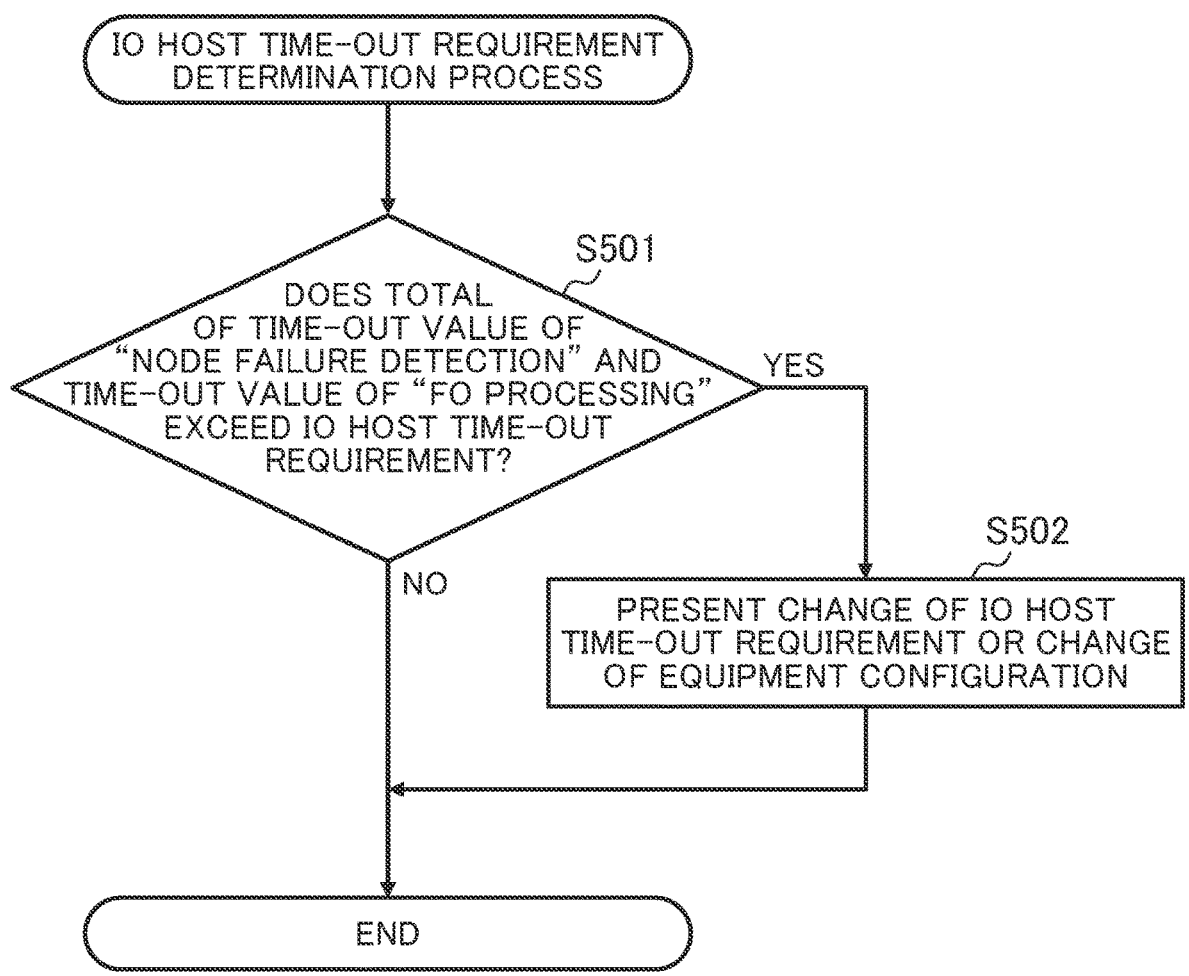
FIG. 15 is a flowchart for showing a processing procedure example of an IC host time-out requirement determination process.

FIG. 15 is a flowchart for showing a processing procedure example of the IO host time-out requirement determination process. The IO host time-out requirement determination process shown in FIG. 15 corresponds to the process of Step S104 in FIG. 11 and is executed by the IO host time-out determination unit 113.

As described above, the IO host time-out requirement determination process is a process for determining in advance during the install process whether or not to be in the setting in which an IO error may occur due to erroneous node failure detection. First, the relationship between the node failure and the IO error in the storage system 1 will be described.

When a node failure occurs in any node (storage node 10) in the storage system 1 and IO from the IO host 20 to the node stops, the node failure is detected by the node monitoring unit 123 of a normal storage node 10. The time until being regarded as a node failure is referred to as a time-out value of node failure detection. In the case where a node failure of an operating system is detected, the node monitoring unit 123 of a normal storage node 10 performs the failover processing (FO processing) to switch to a standby system using a node where no node failure has occurred. Therefore, the maximum failover time (FO time) from the occurrence of the node failure to the completion of the failover is the total value of the time-out value set for the node failure detection and the time-out value set for the FO processing. It should be noted that the IO from the IO host 20 remains stopped until the above-described series of failover is completed, in other words, from the node failure detection to the completion of the FO processing.

On the other hand, as a general function of the storage system, the storage system 1 is provided with a function for determining as an IO error in the case where the state in which the IO from the IO host 20 is stopped satisfies a predetermined requirement. The requirement for determining the IO error is set in the IO host time-out information 149, and "30 seconds" is set in the case of the IO host time-out information 149 in FIG. 9. Therefore, in consideration of the description in the preceding paragraph, in the case where a node failure occurs in a certain storage node 10, it is determined as an IO error if the node failure detection and the FO processing are not completed within 30 seconds.

In the case of a heavy network load environment, there is a risk that the maximum failover time (FO time) exceeds the current IO host time-out requirement. Accordingly, by executing the IO host time-out requirement determination process in the embodiment, the maximum time allowed for the failover time (FO time) required for a series of failover determined on the basis of the operation environment of the storage node 10 is compared with the IO host time-out information 149 to determine whether or not the current IO host time-out requirement is appropriate.

According to FIG. 15, the IO host time-out determination unit 113 first determines whether or not the total of the time-out values (operation environment adaptive values) of the "node failure detection" and the "FO processing" in the during-operation time-out value 148 exceeds the IO host time-out requirement stored in the IO host time-out information 149 (Step S501). In the case where the total of the node failure detection and the FO processing does not exceed the IO host time-out requirement in Step S501 (NO in Step S501), the IO host time-out determination unit 113 terminates the IO host time-out requirement determination process since no particular process is required. On the other hand, in the case where the total of the node failure detection and the FO processing exceeds the IO host time-out requirement in Step S501 (YES in Step S501), the process proceeds to Step S502.

In other words, the process in Step S501 is a process for comparing the time-out value of the operation environment with the IO host time-out requirement. It should be noted that the node failure detection and the FO processing are mentioned as the time-out values of the operation environment in the example, but these are only examples. In the case where there is a process having an element for stopping IO among a series of processes relating to the failover in addition to these processes, it is preferable to add the time-out value of the process to the time-out values of the operation environment as appropriate to perform the comparison and determination in Step S501.

When the process of Step S501 is confirmed using specific values, the operation environment adaptive value of the node failure detection is "8 seconds" and the operation environment adaptive value of the FO processing is "30 seconds" in the during-operation time-out value 148 of FIG. 9, so that the total time is 38 seconds. On the other hand, the IO host time-out requirement is "30 seconds" in the IO host time-out information 149 of FIG. 10. Therefore, since the total of the time-out values of the "node failure detection" and the "FO processing" exceeds the IO host time-out requirement in this case, the process proceeds to Step S502.

In Step S502, the IO host time-out determination unit 113 presents a notification recommending a change in the IO host time-out requirement or a change in the device configuration of the storage system 1 to the user by displaying the notification on a management screen or the like.

In the case where a change in the IO host time-out requirement is recommended, for example, it is proposed to extend the time-out value of the IO host time-out requirement from the current "30 seconds" to "40 seconds" in consideration of the comparison result in Step S501. Then, in the case where the user inputs to change the time-out value of the IO host time-out requirement, the IO host time-out determination unit 113 updates the setting value of the IO host time-out information 149. In addition, the user similarly updates the time-out value held in the IO host 20.

By executing the time-out initial setting process as described above, the install processing unit 110 can change the time-out values in various install processes to values adapted to the current operation environment of the system according to the current network quality, and it is possible to prevent the install process from failing. In addition, by executing the time-out initial setting process, the install processing unit 110 can change the time-out values in various processes during the operation to values adapted to the current operation environment of the system according to the current network quality. As a result, the storage system 1 can prevent erroneous detection of a node failure due to the fact that the time-out value of the node failure detection is too short and generation of an IC error due to the fact that the IC host time-out value is too short.

(3-2) Time-Out Updating Process

FIG. 16 is a flowchart for showing a processing procedure example of the time-out updating process. The time-out updating process is a process periodically executed during the system operation of the storage system 1, and is executed by each unit of the cluster control unit 120 shown in FIG. 3. It should be noted that as a modified example of the embodiment, the time-out updating process may be executed in the case where a predetermined execution trigger is satisfied during the system operation of the storage system 1. The predetermined execution trigger is, for example, a situation in which a large change in the information stored in the storage operation information 142 is assumed, and specifically, it is conceivable that for example, the predetermined execution trigger is set when execution of a heavy network load process such as rebuilding or rebalancing is started and after the execution is completed. As another example, for example, it is also conceivable that the predetermined execution trigger is set when a processing error occurs.

According to FIG. 16, the cluster control unit 120 allows the following units to repeatedly execute the processes of Steps S602 to S604 with a predetermined period of sleep interposed therebetween (Step S601).

In Step S602, the network delay confirmation unit 121 executes a network delay confirmation process for confirming the delay status of the network in the operation environment. The network delay confirmation process in Step S602 is the same as the network delay confirmation process (Step S101 in FIG. 11) in the time-out initial setting process, the details thereof have already been described with reference to FIG. 12, and thus the description thereof will be omitted.

In Step S603 that follows, the time-out updating unit 122 executes a storage operation status confirmation process for confirming the current operation status of the storage node 10. Although the details thereof will be described later with reference to FIG. 17, in the storage operation status confirmation process, the time-out updating unit 122 acquires the system statistical information and the current value of the storage process being executed, calculates the load influence of each current value, and stores the current value and the load influence in the system statistical information 143 and the storage processing information 144.

In Step S604 that follows, the time-out updating unit 122 executes a during-operation time-out value updating process for updating the during-operation time-out value 148. The during-operation time-out value updating process in Step S604 is the same as the during-operation time-out value updating process (Step S103 in FIG. 11) in the time-out initial setting process, the details thereof have already been described with reference to FIG. 14, and thus the description thereof will be omitted. However, as a point different from the during-operation time-out value updating process of the time-out initial setting process, since the current value and the load influence thereof have already been stored in the storage operation information 142 during the operation, the network delay information 141 and the storage operation information 142 (the system statistical information 143 and the storage processing information 144) are referred to and the values of the load influences of current values 1413, 1433, and 1443 are acquired from the respective pieces of information in the processes of Steps S401 to S402.

As described above, each unit of the cluster control unit 120 periodically and repeatedly executes the processes of Steps S602 to S604, so that the time-out values of various processes during the operation can be updated to the operation environment adaptive values according to the operation environment of the system. As a result, for example, when the network load is low, the time-out values of various processes such as the node failure detection are shortened, so that it is possible to adjust the failover time so as to be shortened while avoiding erroneous detection of a node failure. In addition, for example, when the network load is heavy, the time-out values of various processes such as the node failure detection are increased, so that it is possible to adjust to an appropriate failover time while avoiding erroneous detection of a node failure.

Figure 17:
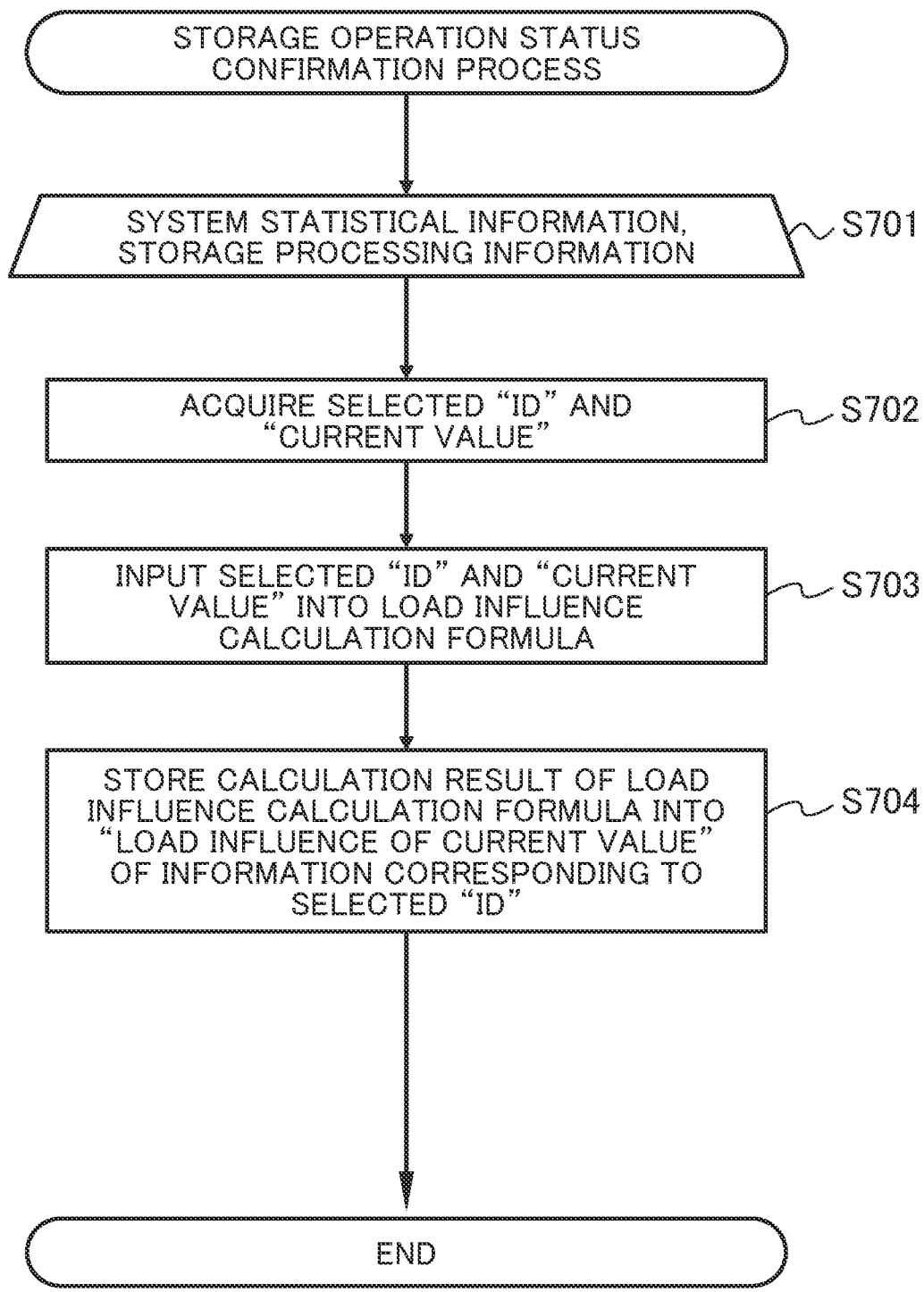
FIG. 17 is a flowchart for showing a processing procedure example of a storage operation status confirmation process.

FIG. 17 is a flowchart for showing a processing procedure example of the storage operation status confirmation process. The storage operation status confirmation process shown in FIG. 17 corresponds to the process of Step S603 in FIG. 16, and is executed by the time-out updating unit 122.

According to FIG. 17, the time-out updating unit 122 selects one of a plurality of pieces of information (specifically, the statistical elements such as the "IC performance" and the "packet amount" held by the system statistical information 143 and the "storage processing information" held by the storage processing information 144) held by the storage operation information 142, and starts the processes of Steps S702 to S704 (Step S701). The selection targets in Step S701 are information that can be identified by IDs, and when referring to, for example, FIG. 6 and FIG. 7, the selection targets correspond to the "IC performance" to which the ID "2" is assigned, the "packet amount" to which the ID "3" is assigned, and the "storage processing information" to which the ID "4" is assigned.

In Step S702, the time-out updating unit 122 refers to the system statistical information 143 or the storage processing information 144, and acquires the current value of the target selected in Step S701. For example, in the case where the "IC performance" of the ID "2" is selected in Step S701, the time-out updating unit 122 acquires the current value of the IC performance from the value 1432 of the system statistical information 143 in Step S702. In addition, for example, in the case where the "storage processing information" of the ID "4" is selected in Step S701, the time-out updating unit 122 acquires the current value of the storage processing information from the value 1442 of the storage processing information 144 in Step S702.

Next, in Step S703, the time-out updating unit 122 inputs the ID and the current value acquired in Step S702 to the load influence calculation formula 145, and calculates the fundamental coefficient and the fundamental addition value. For example, in the case where the "IC performance" of the ID "2" is selected in Step S701, the time-out updating unit 122 calculates the fundamental coefficient c2 and the fundamental addition value a2 using the load influence calculation formula 145 in Step S703. In addition, for example, in the case where the "storage processing information" of the ID "4" is selected in Step S701, the time-out updating unit 122 calculates the fundamental coefficient c4 and the fundamental addition value a4 using the load influence calculation formula 145 in Step S703.

Next, in Step S704, the time-out updating unit 122 updates the load influence of current value of the information (the system statistical information 143 or the storage processing information 144) holding the ID of the target selected in Step S701 with the calculation result in Step S703. For example, in the case where the "IC performance" of the ID "2" is selected in Step S701, the time-out updating unit 122 updates, in Step S704, the fundamental coefficient and the fundamental addition value of the IC performance in the load influence of current value 1433 of the system statistical information 143 with the fundamental coefficient c2 and the fundamental addition value a2 calculated in Step S703. In addition, for example, in the case where the "storage processing information" of the ID "4" is selected in Step S701, the time-out updating unit 122 updates, in Step S704, the fundamental coefficient and the fundamental addition value of the IC performance in the load influence of current value 1443 of the storage processing information 144 with the fundamental coefficient c4 and the fundamental addition value a4 calculated in Step S703.

After the completion of Step S704, the time-out updating unit 122 returns to Step S701, selects one of the next targets, and repeats the processes of Steps S702 to S704. Then, when the processes of Steps S702 to S704 are completed for all the targets, the time-out updating unit 122 terminates the storage operation status confirmation process.

Figure 18:
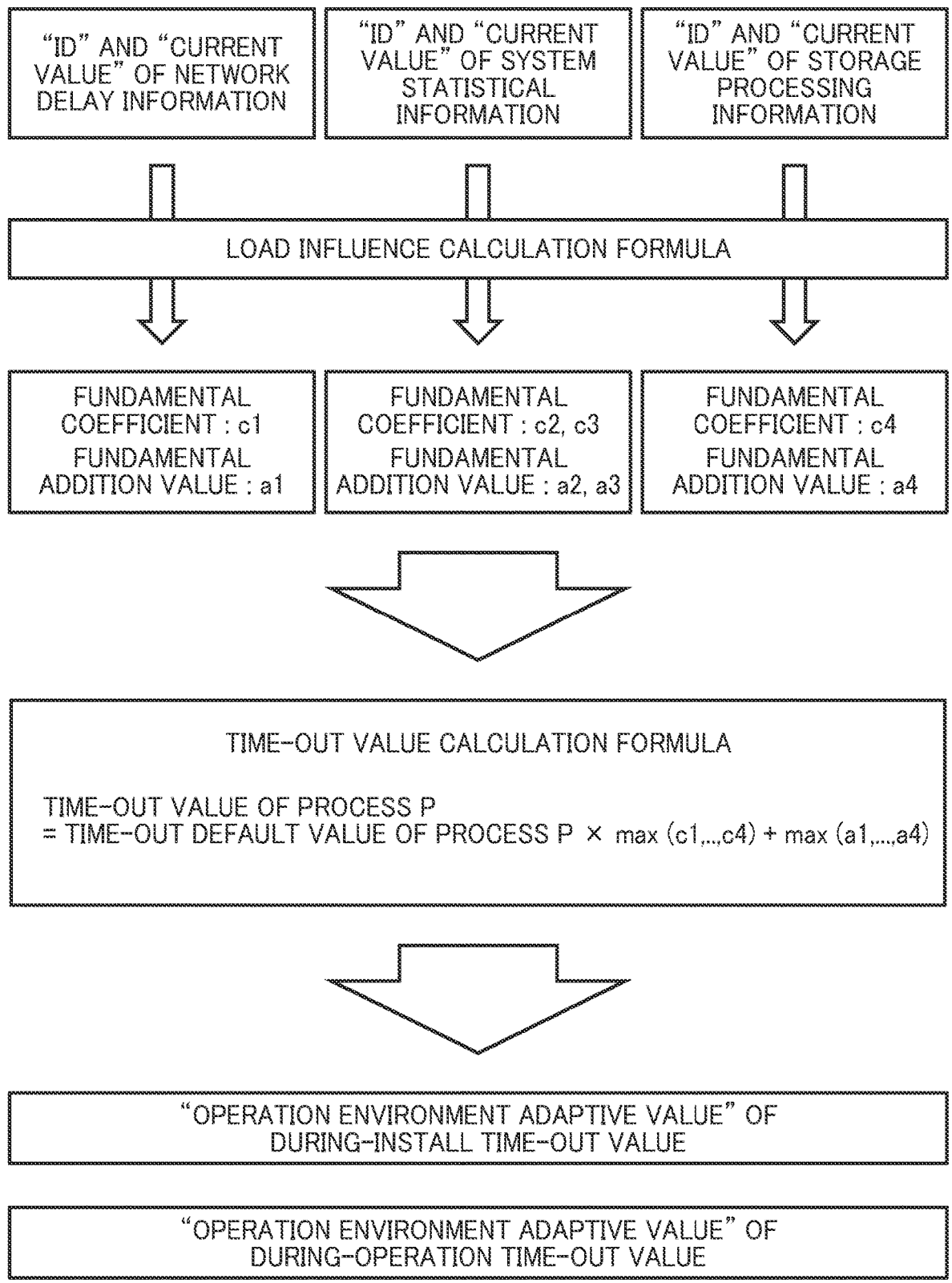
FIG. 18 is an image diagram for explaining a method of determining an operation environment adaptive value of a time-out value.

FIG. 18 is an image diagram for explaining a method of determining the operation environment adaptive value of the time-out value. As described above, in the embodiment, the during-install time-out value and the during-operation time-out value are determined in the time-out initial setting process executed during the install, and the during-operation time-out value is updated in the time-out updating process periodically executed during the operation. Then, each of these time-out values is calculated as the operation environment adaptive value according to the operation environment on the basis of the current value of information indicating the operation environment of the system. FIG. 18 schematizes a method of determining the operation environment adaptive value of such a time-out value. It should be noted that since the details of each stage shown in the drawing have already been described with reference to FIG. 13 and FIG. 14, the repeated description thereof will be omitted.

As shown in FIG. 18, when calculating the time-out value in the embodiment, the network delay confirmation units 111 and 121 first calculate the fundamental coefficient c1 and the fundamental addition value a1 from the load influence calculation formula 145 by using the ID and the current value of the network delay information 141 as inputs. In addition, for each piece of information (the system statistical information 143 and the storage processing information 144) indicating the operation status of the storage system, the time-out updating unit 122 calculates a fundamental coefficient $c_i$ and a fundamental addition value $a_i$ (where i is an ID value) from the load influence calculation formula 145 by using the ID and the current value of each piece of information as inputs. Next, the time-out initial setting unit 112 or the time-out updating unit 122 can calculate, from the time-out value calculation formula 146 for each process, the operation environment adaptive value of the time-out value of the process by using the fundamental coefficient $c_i$ and the fundamental addition value $a_i$ calculated from the load influence calculation formula 145 as inputs.

(3-3) Concrete Example of Updating During-Operation Time-Out Value

In the following, the way of updating the time-out value by the time-out updating process during the operation will be confirmed according to concrete status examples (a first case and a second case) during the operation.

(3-3-1) First Case

In the first case, it is assumed that the IC performance (response time) extended from the base value to twice the base value during the operation, and then changed to one time. The first case represents, for example, a status in which the IC performance temporarily deteriorated due to an increase in the network load or concentration of access during the operation, and then returned to the normal value. It should be noted that in the first case, it is assumed that there is no heavy network load storage process being executed, and "no processing" is stored in the current value of the storage processing information 144. In addition, in the case where the current value of the storage processing information 144 is "no processing", the load influence calculated from the current value is assumed to be the fundamental coefficient c4 "1" and the fundamental addition value a4 "0".

In the first case, it is assumed that the time-out updating process of FIG. 16 was first executed when the IC performance became twice the base value from the base value. It should be noted that in the description, it is assumed that only the IC performance changes and the other metrics (measured values) do not change in order to clarify a change in the time-out value when the IC performance becomes twice the base value from the base value. However, in practice, it may be assumed that the other metrics may change when the IC performance changes.

At this time, the network delay confirmation process (see FIG. 12 for details) of Step S602 proceeds as follows.

If a network delay value of "10 ms" has been measured using a ping command in Step S201, the current value of the network delay information 141 is updated to "10" in Step S202. Next, in Step S203, the ID "1" and the current value "10" of the network delay information 141 are input to the load influence calculation formula 145 of the network delay information, and the fundamental coefficient c1 "1" and the fundamental addition value a1 "0" are calculated. Then, in Step S204, the calculation result in Step S203 is stored in the load influence of current value 1413 of the network delay information 141.

Next, the storage operation status confirmation process (see FIG. 17 for details) of Step S603 proceeds as follows.

In the case where the "IC performance" is selected in Step S701, the ID "2" of the IC performance and the current value "10 (a value twice the base value)" are acquired from the system statistical information 143 in Step S702. In Step S703, these values are input to the load influence calculation formula 145, and the fundamental coefficient c2 "1.5" and the fundamental addition value a2 "1" are calculated. Then, in Step S704, the calculation result in Step S703 is stored in the load influence of current value 1433 of the IC performance of the system statistical information 143.

As similar to the above, in the case where the "packet amount" is selected in Step S701, the fundamental coefficient c3 "1" and the fundamental addition value a3 "0" are calculated from the load influence calculation formula 145 by using the ID "3" acquired from the system statistical information 143 and the current value "1000" of the packet amount as inputs (Step S703), and these calculation results are stored in the current load influence 1433 of the packet amount of the system statistical information 143 (Step S704).

In addition, as similar to the above, in the case where the "storage processing information" is selected in Step S701, the fundamental coefficient c4 "1" and the fundamental addition value a4 "0" are calculated from the load influence calculation formula 145 by using the ID "4" acquired from the storage processing information 144 and the current value "no processing" of the storage processing information as inputs (Step S703), and these calculation results are stored in the current load influence 1443 of the storage processing information 144 (Step S704).

Next, the during-operation time-out value updating process (see FIG. 14 for details) of Step S604 proceeds as follows.

In Steps S401 to S402, the load influence of current value is acquired from each of the network delay information 141 and the storage operation information 142 (the system statistical information 143 and the storage processing information 144). When the concrete value of the load influence acquired from each information is expressed in the form of (fundamental coefficient, fundamental addition value), the network delay information is (1, 0), the IO performance is (1.5, 1), the packet amount is (1, 0), and the storage processing information is (1, 0).

Then, for each process (in the example of FIG. 9, the node failure detection, the FO processing, and the process C during the operation) that holds the time-out value with the during-operation time-out value 148, the load influence acquired in Step S402 is input to the time-out value calculation formula 146 of each process in Steps S403 to S405, so that the time-out value of each process is calculated and the operation environment adaptive value of the during-operation time-out value 148 is updated. Specifically, since the time-out value of the node failure detection is calculated as "time-out value of node failure detection=time-out default value of node failure detection×max (1, 1.5, 1, 1)+max (0, 1, 0, 0)=4×1.5+1=7", "7" is stored in the operation environment adaptive value of the node failure detection. As similar to the above, the result of calculating the time-out value for the FO processing is "15×1.5+1=23.5", and "23.5" is stored in the operation environment adaptive value of the FO processing. In addition, the result of calculating the time-out value for the process C during the operation is "10×1.5+1=16", and "16" is stored in the operation environment adaptive value of the process C during the operation. It should be noted that all of the above-described calculation results are assumed to fall within the preliminarily-set allowable range of the operation environment adaptive value.

As described above, when the IO performance (response time) becomes twice the base value from the base value in the first case, the cluster control unit 120 can determine each of the operation environment adaptive values of the various processes during the operation (the node failure detection, the FO processing, and the process C during the operation) held by the during-operation time-out value 148 to be a value larger than the default value. That is, when the IO performance temporarily deteriorates due to an increase in the network load or concentration of access during the operation, the cluster control unit 120 can extend the time-out values of various processes during the operation. Accordingly, erroneous detection of various failures caused by the short time-out value can be prevented.

Next, in the first case, it is assumed that the time-out updating process was executed when the IO performance became the base value from twice the base value. It should be noted that in the description, it is assumed that only the IO performance changes and the other metrics (measured values) do not change in order to clarify a change in the time-out value when the IO performance becomes the base value from twice the base value. However, in practice, it may be assumed that the other metrics may change when the IO performance changes.

At this time, as shown in FIG. 16, the network delay confirmation process (see FIG. 12 for details) is first executed in Step S602. The detail is omitted because it is the same as the case where the IO performance becomes twice the base value from the base value, but if the network delay value has not changed, the current value is "10" in the network delay information 141, the fundamental coefficient c1 is "1", and the fundamental addition value a1 is "0" in the load influence of current value 1413.

Next, in Step S603, the storage operation status confirmation process (see FIG. 17 for details) is executed. Specifically, the storage operation status confirmation process proceeds as follows.

In the case where the "IO performance" is selected in Step S701, the ID "2" of the IC performance and the current value "5 (a value equal to the base value)" are acquired from the system statistical information 143 in Step S702. In Step S703, these values are input to the load influence calculation formula 145, and the fundamental coefficient c2 "1" and the fundamental addition value a2 "0" are calculated. Then, in Step S704, the calculation result in Step S703 is stored in the load influence of current value 1433 of the IC performance of the system statistical information 143.

It should be noted that if it is assumed that there is no change in the operation environment for the "packet amount" and the "storage processing information", the processing result of the storage operation status confirmation process for the "packet amount" and the "storage processing information" is the same as the case where the IC performance becomes twice the base value from the base value as described above. That is, in the case where the "packet amount" is selected in Step S701, the fundamental coefficient c3 "1" and the fundamental addition value a3 "0" are stored in the load influence of current value 1433 of the packet amount of the system statistical information 143, and in the case where the "storage processing information" is selected in Step S701, the fundamental coefficient c4 "1" and the fundamental addition value a4 "0" are stored in the current load influence 1443 of the storage processing information 144.

Next, in Step S604, the during-operation time-out value updating process (see FIG. 14 for details) is executed. Specifically, the during-operation time-out value updating process proceeds as follows.

In Steps S401 to S402, the load influence of current value is acquired from each of the network delay information 141 and the storage operation information 142 (the system statistical information 143 and the storage processing information 144). When the concrete value of the load influence acquired from each information is expressed in the form of (fundamental coefficient, fundamental addition value), the network delay information is (1, 0), the IO performance is (1, 0), the packet amount is (1, 0), and the storage processing information is (1, 0). When comparing with the case where the IO performance becomes twice the base value from the base value as described above, a different point is that the IO performance becomes (1, 0) from (1.5, 1).

Then, for each process (in the example of FIG. 9, the node failure detection, the FO processing, and the process C during the operation) that holds the time-out value with the during-operation time-out value 148, the load influence acquired in Step S402 is input to the time-out value calculation formula 146 of each process in Steps S403 to S405, so that the time-out value of each process is calculated and the operation environment adaptive value of the during-operation time-out value 148 is updated. Specifically, since the time-out value of the node failure detection is calculated as "time-out value of node failure detection=time-out default value of node failure detection×max (1, 1, 1, 1)+max (0, 0, 0, 0)=4×1+0=4", "4" is stored in the operation environment adaptive value of the node failure detection. As similar to the above, the result of calculating the time-out value for the FO processing is "15×1+0=15", and "15" is stored in the operation environment adaptive value of the FO processing. In addition, the result of calculating the time-out value for the process C during the operation is "10×1+0=10", and "10" is stored in the operation environment adaptive value of the process C during the operation. It should be noted that all of the above-described calculation results are assumed to fall within the preliminarily-set allowable range of the operation environment adaptive value.

As described above, when the IO performance (response time) returns from twice the base value to the base value in the first case, the cluster control unit 120 can determine each of the operation environment adaptive values of the various processes during the operation (the node failure detection, the FO processing, and the process C during the operation) held by the during-operation time-out value 148 to be a value equal to the default value. That is, when the IO performance is improved by resolving an increase in the network load or concentration of access during the operation, the cluster control unit 120 can shorten the time-out values of various processes during the operation. Accordingly, a delay in failure detection caused by the long time-out value can be prevented. Therefore, since the node failure detection is not delayed, the failover time can be prevented from being prolonged.

(3-3-2) Second Case

In the second case, it is assumed that the heavy network load storage process being executed was changed from "no processing" to "during rebuilding" and then was changed to "no processing". The second case represents a status in which rebuilding was performed during the operation and then terminated.

It should be noted that in order to clarify the influence of a change in the storage processing on the time-out value in the description, it is assumed that the "packet amount" increases to "1500 KB/s" when the storage processing being executed transits to "during rebuilding", and otherwise, the metrics (measured values) in the network delay information 141 and the storage operation information 142 do not change. However, in practice, it may be assumed that the other metrics may change when the storage processing being executed changes. In addition, in the case where the current value of the "packet amount" is "1500", it is assumed that the fundamental coefficient c3 "1.5" and the fundamental addition value a3 "1" are calculated from the load influence calculation formula 145. In the case where the current value of the "storage processing information" is "during rebuilding", it is assumed that the fundamental coefficient c4 "1.5" and the fundamental addition value a4 "2" are calculated from the load influence calculation formula 145.

In the second case, it is assumed that the time-out updating process of FIG. 16 was executed when the storage processing being executed transited to "during rebuilding" and when transiting to "no processing" thereafter. It should be noted that the description of the outline of the progress of the process in the time-out updating process will be omitted because the outline is the repetition of the description in the first case, and a concrete value different from the first case will be mainly described.

Based on the above, the time-out updating process when the storage processing being executed is "during rebuilding" in the second case proceeds as follows.

First, in the network delay confirmation process (see FIG. 12 for details) of Step S602, "10" is stored in the current value for the network delay information 141, and the fundamental coefficient c1 "1" and the fundamental addition value a1 "0" are stored in the load influence of current value 1413.

Next, the storage operation status confirmation process (see FIG. 17 for details) of Step S603 proceeds as follows.

In the case where the "IO performance" is selected in Step S701, since the ID "2" of the IO performance and the current value "5" are acquired from the system statistical information 143, the fundamental coefficient c2 "1" and the fundamental addition value a2 "0" are calculated from the load influence calculation formula 145 and are stored in the load influence of current value 1433 of the IO performance of the system statistical information 143. In addition, in the case where the "packet amount" is selected in Step S701, since the ID "3" of the packet amount and the current value "1500" are acquired from the system statistical information 143, the fundamental coefficient c3 "1.5" and the fundamental addition value a3 "1" are calculated from the load influence calculation formula 145 and are stored in the load influence of current value 1433 of the packet amount of the system statistical information 143. As described above, in the description, it is assumed that the packet amount during rebuilding increases to 1500 KB/s. In addition, in the case where the "storage processing information" is selected in Step S701, since the ID "4" of the storage processing information and the current value "during rebuilding" are acquired from the storage processing information 144, the fundamental coefficient c4 "1.5" and the fundamental addition value a4 "2" are calculated from the load influence calculation formula 145 and are stored in the current load influence 1443 of the storage processing information 144.

Next, the during-operation time-out value updating process (see FIG. 14 for details) of Step S604 proceeds as follows.

In Steps S401 to S402, the load influence of current value is acquired from each of the network delay information 141 and the storage operation information 142 (the system statistical information 143 and the storage processing information 144). When the concrete value of the load influence acquired from each information is expressed in the form of (fundamental coefficient, fundamental addition value), the network delay information is (1, 0), the IO performance is (1, 0), the packet amount is (1.5, 1), and the storage processing information is (1.5, 2).

Then, in Steps S403 to S405, for each process (in the example of FIG. 9, the node failure detection, the FO processing, and the process C during the operation) that holds the time-out value with the during-operation time-out value 148, the time-out value is calculated from the time-out value calculation formula 146 for each process and the operation environment adaptive value of the during-operation time-out value 148 is updated. Specifically, since the time-out value of the node failure detection is calculated as "time-out value of node failure detection=time-out default value of node failure detection×max (1, 1, 1.5, 1)+max (0, 0, 1, 2)=4×1.5+2=8", "8" is stored in the operation environment adaptive value of the node failure detection. As similar to the above, the result of calculating the time-out value for the FO processing is "15×1.5+2=24.5", and "24.5" is stored in the operation environment adaptive value of the FO processing. In addition, the result of calculating the time-out value for the process C during the operation is "10×1.5+2=17", and "17" is stored in the operation environment adaptive value of the process C during the operation. It should be noted that all of the above-described calculation results are assumed to fall within the preliminarily-set allowable range of the operation environment adaptive value.

As described above, when the rebuilding is being executed in the second case, the cluster control unit 120 can determine each of the operation environment adaptive values of the various processes during the operation (the node failure detection, the FO processing, and the process C during the operation) held by the during-operation time-out value 148 to be a value larger than the default value. That is, when the heavy network load storage process is executed and the network quality deteriorates during the operation, the cluster control unit 120 can extend the time-out values of various processes during the operation. Accordingly, erroneous detection of various failures caused by the short time-out value can be prevented.

Next, the time-out updating process after the storage processing being executed transits from "during rebuilding" to "no processing" in the second case proceeds as follows.

First, in the network delay confirmation process (see FIG. 12 for details) of Step S602, "10" is stored in the current value for the network delay information 141, and the fundamental coefficient c1 "1" and the fundamental addition value a1 "0" are stored in the load influence of current value 1413.

Next, the storage operation status confirmation process (see FIG. 17 for details) of Step S603 proceeds as follows.

In the case where the "IC performance" is selected in Step S701, since the ID "2" of the IC performance and the current value "5" are acquired from the system statistical information 143, the fundamental coefficient c2 "1" and the fundamental addition value a2 "0" are calculated from the load influence calculation formula 145 and are stored in the load influence of current value 1433 of the IC performance of the system statistical information 143. In addition, in the case where the "packet amount" is selected in Step S701, since the ID "3" of the packet amount and the current value "1000" are acquired from the system statistical information 143, the fundamental coefficient c3 "1" and the fundamental addition value a3 "0" are calculated from the load influence calculation formula 145 and are stored in the load influence of current value 1433 of the packet amount of the system statistical information 143. In addition, in the case where the "storage processing information" is selected in Step S701, since the ID "4" of the storage processing information and the current value "no processing" are acquired from the storage processing information 144, the fundamental coefficient c4 "1" and the fundamental addition value a4 "0" are calculated from the load influence calculation formula 145 and are stored in the current load influence 1443 of the storage processing information 144.

Next, the during-operation time-out value updating process (see FIG. 14 for details) of Step S604 proceeds as follows.

In Steps S401 to S402, the load influence of current value is acquired from each of the network delay information 141 and the storage operation information 142 (the system statistical information 143 and the storage processing information 144). When the concrete value of the load influence acquired from each information is expressed in the form of (fundamental coefficient, fundamental addition value), the network delay information is (1, 0), the IO performance is (1, 0), the packet amount is (1, 0), and the storage processing information is (1, 0).

Then, in Steps S403 to S405, for each process (in the example of FIG. 9, the node failure detection, the FO processing, and the process C during the operation) that holds the time-out value with the during-operation time-out value 148, the time-out value is calculated from the time-out value calculation formula 146 for each process and the operation environment adaptive value of the during-operation time-out value 148 is updated. Specifically, since the time-out value of the node failure detection is calculated as "time-out value of node failure detection=time-out default value of node failure detection×max (1, 1, 1, 1)+max (0, 0, 0, 0)=4×1+0=4", "4" is stored in the operation environment adaptive value of the node failure detection. As similar to the above, the result of calculating the time-out value for the FO processing is "15×1+0=15", and "15" is stored in the operation environment adaptive value of the FO processing. In addition, the result of calculating the time-out value for the process C during the operation is "10×1+0=10", and "10" is stored in the operation environment adaptive value of the process C during the operation. It should be noted that all of the above-described calculation results are assumed to fall within the preliminarily-set allowable range of the operation environment adaptive value.

As described above, when the rebuilding is completed and the heavy network load storage process is not executed in the second case, the cluster control unit 120 can determine each of the operation environment adaptive values of the various processes during the operation (the node failure detection, the FO processing, and the process C during the operation) held by the during-operation time-out value 148 to be a value equal to the default value. That is, when the heavy network load storage process is completed and the network quality is improved during the operation, the cluster control unit 120 can shorten the time-out values of various processes during the operation. Accordingly, a delay in failure detection caused by the long time-out value can be prevented. Therefore, since the node failure detection is not delayed, the failover time can be prevented from being prolonged.

As is apparent from the changes in the time-out values in the first case and the second case as described above, in the storage system 1 according to the embodiment, the cluster control unit 120 directly or indirectly determines the load status from the network delay information 141 and the storage operation information 142, and can extend or shorten the time-out values of various processes during the operation (for example, the node failure detection) according to the network quality.

Thus, according to the storage system 1 of the embodiment, the time-out values in the predetermined various processes included in the process during the install or the process during the operation are updated and set to values adapted to the operation environment according to the network quality, so that erroneous detection of a node failure due to insufficient time-out values when the network load is heavy can be prevented, the IO stop time (FO time) until the failover is completed when the node failure occurs can be prevented from being excessively prolonged, and the FO time can be shortened when the network load is low.

The storage system 1 according to the embodiment is particularly suitable for application to the following storage system because the effects as described above can be obtained.

For example, a public cloud environment is characterized in that there are many resource options and various network qualities, and the network quality is not stable due to the influence of other operating systems. The present invention is more effective when being applied to a storage system operated in a public cloud environment having the above characteristics because the time-out value of each process can be flexibly updated to a value adapted to an operation environment in response to changes in the network quality.

In addition, for example, since the network quality is different between an on-premises environment and a public cloud environment, the present invention is particularly effective when the environment is transferred between the both.

In addition to the above examples, the present invention is particularly effective when being applied to a storage system operated in an environment in which the network load fluctuates in the middle. In addition, the present invention is effective regardless of the type of storage device such as a dedicated storage device irrespective of an SDS.

What is claimed is:

1. A storage system comprising:
a plurality of storage nodes having processors;
a storage device for storing data;
the plurality of storage nodes having the processors for processing data to be input to and output from the storage device;
a network for connecting the plurality of storage nodes,
wherein the plurality of storage nodes monitors an operation status of each other to perform node failure detection for determining an occurrence of a failure of a first storage node of the plurality of storage nodes on a basis of a time-out value, performs a failover process in which one of the other storage nodes takes over the process of the first storage node when the failure occurs in the first storage node, and adjusts the time-out value on a basis of the status of the network between the storage nodes,
wherein the plurality of storage nodes has storage operation information having processing information of each storage node, and adjusts the time-out value on a basis of the storage operation information,
wherein the storage operation information includes a process performed by each storage node, and
wherein the time-out value is increased when a load of the process performed by each storage node on the network is determined to be large.

2. The storage system according to claim 1,
wherein the plurality of storage nodes has network delay information relating to the delay of the network between the storage nodes, adjusts the time-out value on a basis of the network delay information, and increases the time-out value when the delay of the network in the network delay information is large.

3. The storage system according to claim 2,
wherein an install processing unit that executes an install process for initializing the storage system by executing a program by the processors is provided, and
wherein the install processing unit confirms a current delay status of the network at a start of the install process, updates the network delay information on a basis of the confirmation result, sets a time-out value of a process during the install to be executed in the install process on a basis of the updated network delay information, and determines and sets a time-out value of a process during the operation that includes the node failure detection and the failover process and can be executed during the system operation on the basis of the updated network delay information.

4. The storage system according to claim 1, wherein the plurality of storage nodes has system statistical information indicating a load of the storage system, and increases the time-out value when the the load of the storage system on the a basis of the system statistical information is determined to be large.

5. The storage system according to claim 4,
wherein statistical elements of information stored in the system statistical information include at least one of IO performance indicating performance for processing IO requested from a host device and a packet amount indicating a data communication amount in the storage node.

6. The storage system according to claim 1, wherein a time until a completion of the failover process when a node failure occurs is calculated on the basis of the time-out value of the node failure detection, and the time until the completion of the failover process is compared with a determination requirement of the an input/output time-out of a host device performing data input/output to/from the storage system, and wherein in a case where the time-out value until the completion of the failover process when a node failure occurs exceeds the determination requirement of the input/output time-out, a coping process is performed.

7. The storage system according to claim 6, wherein the coping process is to present a change in the determination requirement of the input/output time-out or a change in the device configuration of the storage system to a user.

8. The storage system according to claim 1, wherein the time-out value is adjusted when the process performed by one or more of the storage nodes is rebuilding, rebalancing, log collection or updating a file distribution.

9. A control method by a storage system, wherein the storage system comprises:

a plurality of storage nodes having processors;

a storage device for storing data;

the plurality of storage nodes having the processors for processing data to be input to and output from the storage device;

a network for connecting the plurality of storage nodes, wherein the plurality of storage nodes monitors an operation status of each other to perform node failure detection for determining an occurrence of a failure of a first storage node of the plurality of storage nodes on a basis of a time-out value, performs a failover process in which one of the other storage nodes takes over the process of the first storage node when the failure occurs in the first storage node, and adjusts the time-out value on a basis of the status of the network between the storage nodes, wherein the plurality of storage nodes has storage operation information having processing information of each storage node, and adjusts the time-out value on a basis of the storage operation information, wherein the storage operation information includes a process performed by each storage node, and wherein the time-out value is increased when a load of the process performed by each storage node on the network is large.

10. The control method according to claim 9, wherein the time-out value is adjusted when the process performed by one or more of the storage nodes is rebuilding, rebalancing, log collection or updating a file distribution.

\* \* \* \* \*